(12) United States Patent
Hayashi

(10) Patent No.: US 8,817,088 B2
(45) Date of Patent: Aug. 26, 2014

(54) SAMPLE OBSERVATION DEVICE FOR GENERATING SUPER RESOLUTION IMAGE

(75) Inventor: Shinichi Hayashi, Tokyo (JP)

(73) Assignee: Olympus Corporation, Tokyo (JP)

(*) Notice: Subject to any disclaimer, the term of this patent is extended or adjusted under 35 U.S.C. 154(b) by 386 days.

(21) Appl. No.: 13/240,236

(22) Filed: Sep. 22, 2011

(65) Prior Publication Data

US 2012/0081535 A1    Apr. 5, 2012

(30) Foreign Application Priority Data

Sep. 30, 2010   (JP) ................................. 2010-220946

(51) Int. Cl.
```
H04N 9/47       (2006.01)
H04N 7/18       (2006.01)
F21V 9/16       (2006.01)
G01J 1/58       (2006.01)
G01T 1/10       (2006.01)
G21H 3/02       (2006.01)
G21K 5/00       (2006.01)
G01M 11/00      (2006.01)
G06T 5/00       (2006.01)
G02B 21/00      (2006.01)
```

(52) U.S. Cl.
CPC .. *H04N 7/18* (2013.01); *G06T 5/00* (2013.01); *G02B 21/0044* (2013.01); *G02B 21/0076* (2013.01); *G02B 21/032* (2013.01)
USPC ......................... 348/79; 250/458.1; 356/124.5

(58) Field of Classification Search
USPC ........................................................ 348/79
See application file for complete search history.

(56) References Cited

U.S. PATENT DOCUMENTS

| | | | |
|---|---|---|---|
| 5,621,519 A * | 4/1997 | Frost et al. | ................. 356/124.5 |
| 6,097,847 A | 8/2000 | Inoue | |
| 6,687,052 B1 | 2/2004 | Wilson et al. | |

(Continued)

FOREIGN PATENT DOCUMENTS

| | | |
|---|---|---|
| DE | 10 2008 049 878 A1 | 4/2010 |
| EP | 1 933 186 A1 | 6/2008 |

(Continued)

OTHER PUBLICATIONS

Japanese Office Action dated Sep. 17, 2013 issued in counterpart Japanese Application No. 2010-220946.

(Continued)

*Primary Examiner* — Hee-Yong Kim
(74) *Attorney, Agent, or Firm* — Holtz Holtz Goodman & Chick PC

(57) ABSTRACT

A sample observation device includes: an excitation light generation unit; an intermediate image forming unit projecting excitation light to a sample and forming an intermediate image of the sample at an intermediate image position with observing light; a confocal modulation unit modulating spatial intensity distributions of the excitation light and the intermediate image at the position; a modulation drive unit moving a pattern of the modulation unit; an image relay unit relaying on a image forming surface the intermediate image; an image pickup unit converting the distribution of relayed intermediate image into digital image data; and an image processing unit processing on the digital image data. Cutoff frequency of the relay unit and Nyquist frequency of the pickup unit exceed cutoff frequency of the forming unit, and the processing unit performs a high frequency enhancing process for enhancing the high frequency component exceeding the cutoff frequency of the forming unit.

20 Claims, 27 Drawing Sheets

(56) References Cited

U.S. PATENT DOCUMENTS

| | | |
|---|---|---|
| 2002/0154797 A1 | 10/2002 | Yamada et al. |
| 2008/0292135 A1 | 11/2008 | Schafer et al. |
| 2009/0268280 A1 | 10/2009 | Osawa et al. |
| 2011/0182529 A1 | 7/2011 | Kempe et al. |

FOREIGN PATENT DOCUMENTS

| | | |
|---|---|---|
| EP | 1 936 422 A1 | 6/2008 |
| EP | 1 248 132 B1 | 12/2010 |
| JP | 06-68252 A | 3/1994 |
| JP | 11-112795 A | 4/1999 |
| JP | 2002-535716 A | 10/2002 |
| JP | 2002-323660 A | 11/2002 |
| JP | 2005-055540 A | 3/2005 |
| JP | 2007-199572 A | 8/2007 |
| WO | WO 2007/043314 A1 | 4/2007 |
| WO | WO 2007/043382 A1 | 4/2007 |
| WO | WO 2007/051566 A2 | 5/2007 |
| WO | WO 2010/037487 A1 | 4/2010 |

OTHER PUBLICATIONS

Extended European Search Report (EESR) dated Apr. 12, 2012 (in English) in counterpart European Application No. 11007715.3.
Partial European Search Report (PESR) dated Dec. 22, 2011 (in English) in counterpart European Application No. 11007715.3.
Gustafsson M. G. L.: "Surpassing the lateral resolution limit by a factor of two using structured illumination microscopy"; Journal of Microscopy; vol. 198, Pt. 2; pp. 82-87; May 1, 2008.
Gustafsson M. G. L.: "Surpassing the lateral resolution limit by a factor of two using structured illumination microscopy"; Journal of Microscopy; vol. 198, Pt. 2; pp. 82-87; May 1, 2000.
European Communication dated Dec. 17, 2013 (in English) in counterpart European Application No. 11007715.3.

* cited by examiner

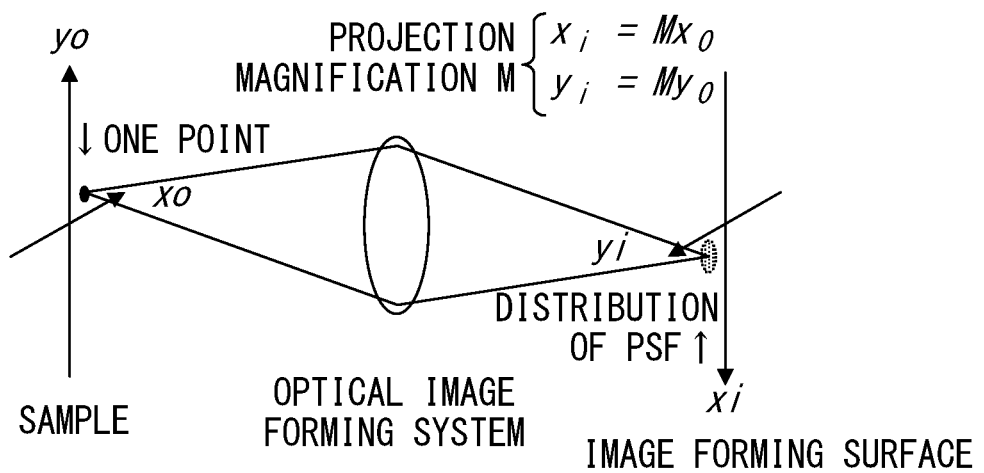
F I G. 1 A

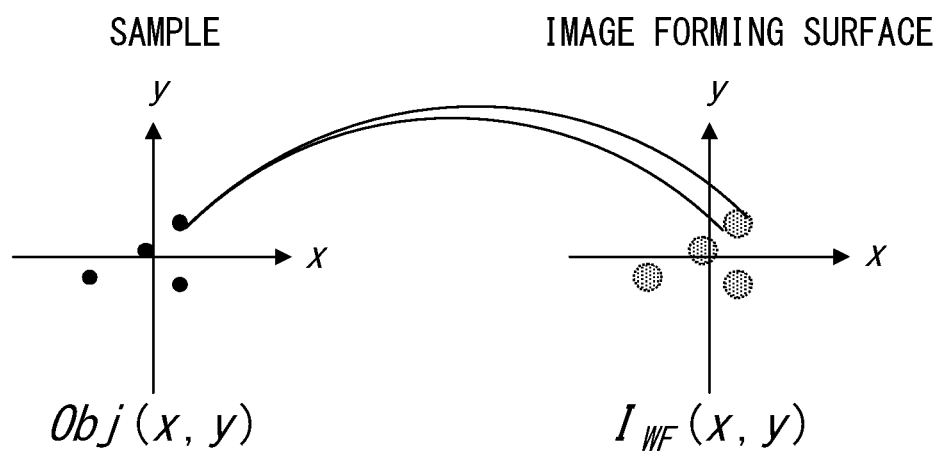
F I G. 1 B

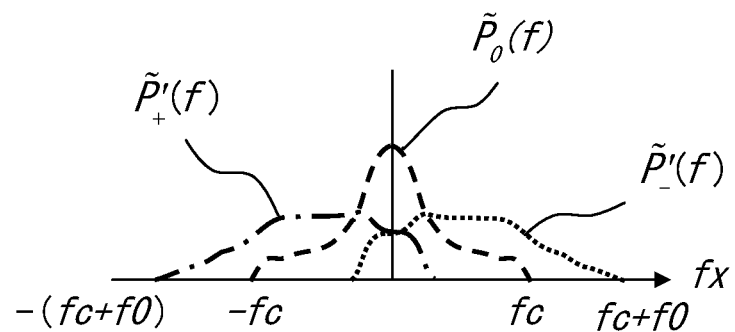
F I G. 4

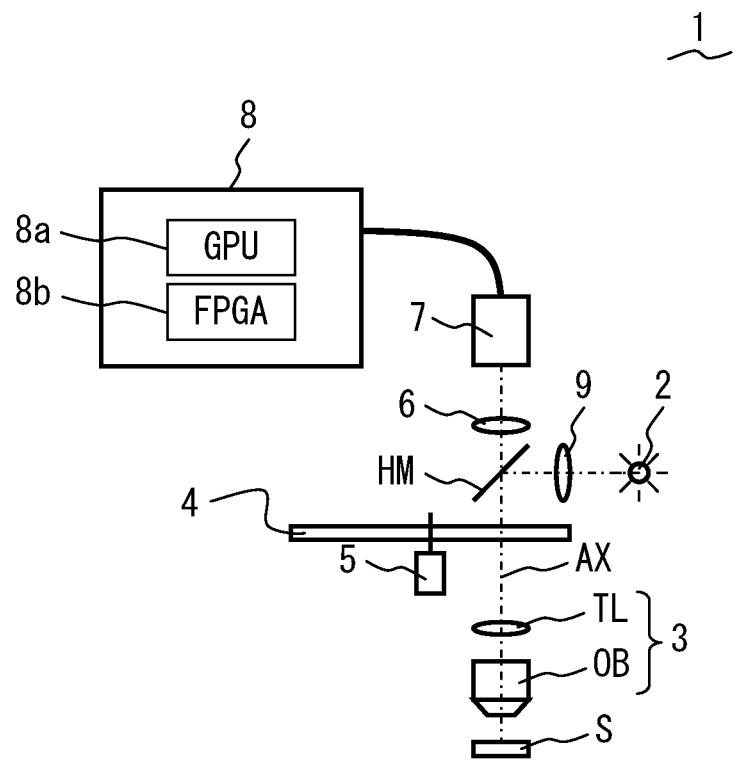
F I G. 6

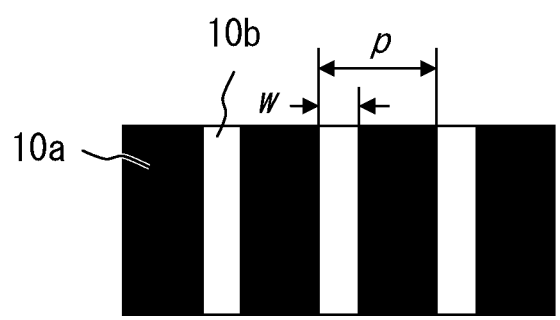
F I G. 8 A

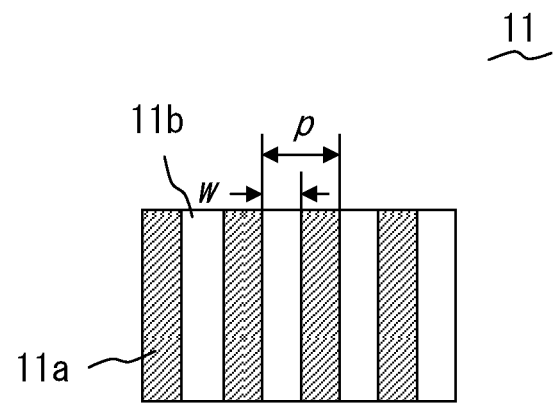
F I G. 9 A

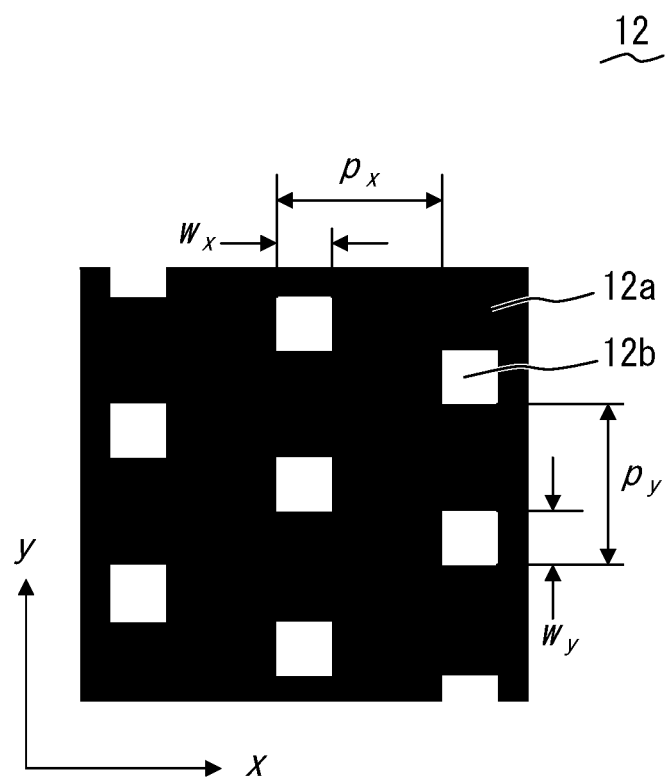
F I G. 10

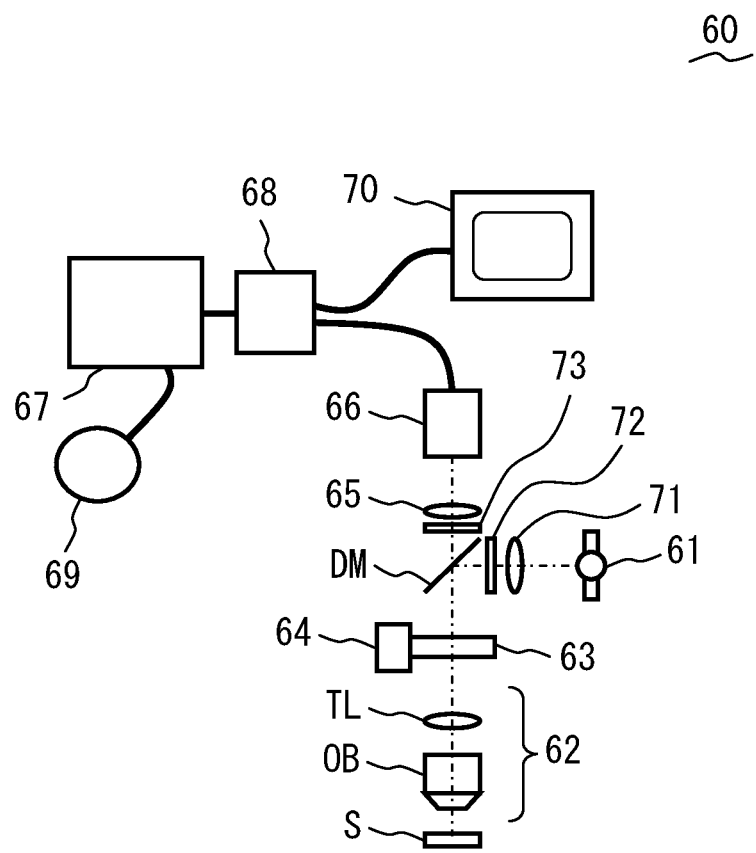
F I G. 14 A

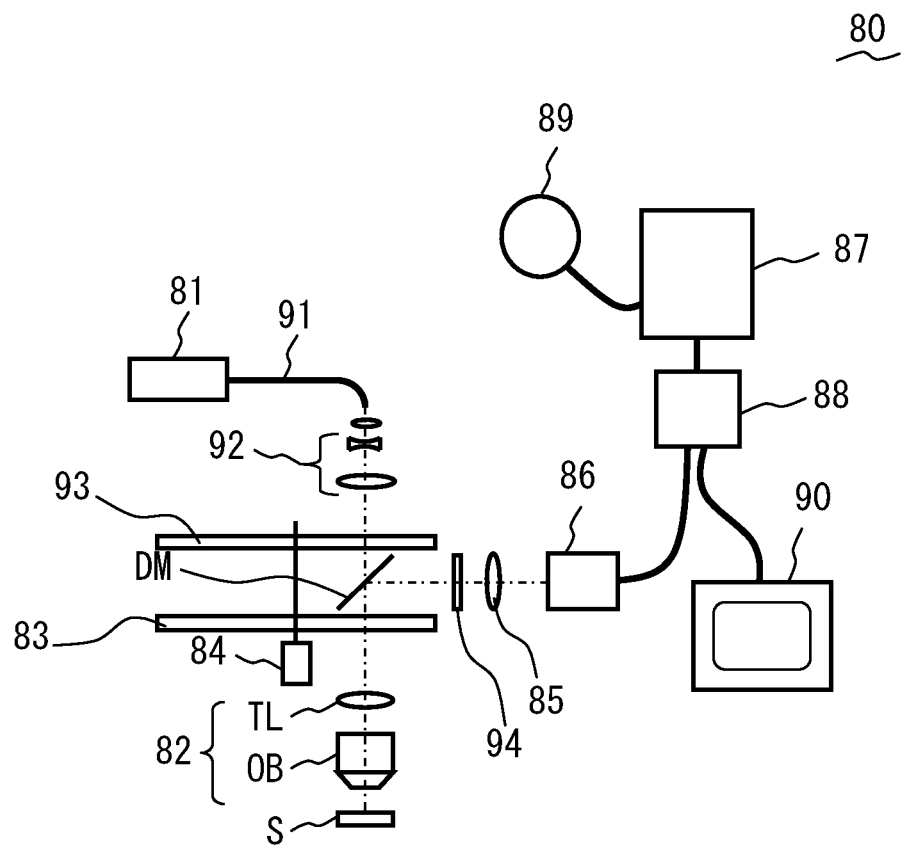
F I G. 1 5 A

SAMPLE OBSERVATION DEVICE FOR GENERATING SUPER RESOLUTION IMAGE

CROSS REFERENCE TO RELATED APPLICATIONS

This application is based upon and claims the benefit of priority from the prior Japanese Patent Application No. 2010-220946, filed Sep. 30, 2010, the entire contents of which are incorporated herein by this reference.

BACKGROUND OF THE INVENTION

1. Field of the Invention

The present invention relates to a sample observation device, and more specifically to a sample observation device capable of acquiring a sample image of super resolution exceeding the resolution limit of an optical system.

2. Description of the Related Art

The technology of obtaining a sample image of the resolution exceeding the resolution limit of an optical image forming system (hereafter referred to as super resolution) has recently been developed and commercialized. The microscopy called "structured illumination microscopy (SIM)" is well known as one of the super resolution techniques. The SIM has been disclosed by, for example, International Publication Pamphlet No. WO 2007/043382.

In a general wide-field observation, the illuminating light is emitted to a sample and the sample is irradiated with the illuminating light as uniformly as possible. However, in the SIM, the illuminating light is modulated, and a sample is irradiated with stripes of illuminating light. Thus, the frequency of observing light used in forming an image can be shifted. Using this phenomenon, a sample image of super resolution exceeding the resolution limit of an optical image forming system can be generated.

Described below is the method of generating a sample image of super resolution.

FIGS. 1A and 1B are explanatory views about the image-forming characteristics of an optical image forming system. As illustrated in FIG. 1A, when an image is formed by an optical image forming system used in a sample observation device such as a microscope etc., the emission from one point of a sample is not projected to one point of an image forming surface, but is projected with the distribution indicated by the point spread function as a function specific to the optical image forming system. That is, as exemplified in FIG. 1B, the emission from each point of a sample is projected to the image forming surface with the distribution indicated by each point spread function.

Therefore, the optical intensity distribution $I_{WF}(x, y)$ of the sample image obtained by the wide-field observation, the wide-filed observation is an observation by the illumination of a fluorescent sample by uniform excitation light, is given by the convolution of PSF (x, y) and Obj (x, y) as indicated by the following equation (1) where Obj (x, y) is the distribution function of the fluorescent dye of the sample, and PSF (x, y) is the point spread function of the optical image forming system. The spatial coordinate system of the point spread function PSF and the spatial coordinate system of the distribution function Obj of the fluorescent dye are standardized using the magnification M of the optical image forming system.

$$I_{WF}(x,y) = Obj(x,y) \otimes PSF(x,y) \quad (1)$$

When the Fourier transform is performed on the equation (1) into an equation indicating the frequency characteristic, the equation (2) is derived. The tilde (~) indicates a function obtained by performing the Fourier transform. That is, the equation (1) indicates the spatial intensity distribution of a sample image, and the equation (2) indicates the frequency characteristic of the sample image.

$$\tilde{I}_{WF}(f_x,f_y) = \tilde{Obj}(f_x,f_y) \times \tilde{PSF}(f_x,f_y) \quad (2)$$

FIG. 2A exemplifies the frequency characteristic of each of the distribution function of the fluorescent dye and the point spread function of the optical image forming system. FIG. 2B exemplifies the frequency characteristic of the sample image obtained by the fluorescent sample and the optical image forming system having the characteristic illustrated in FIG. 2A.

As illustrated in FIG. 2A, the frequency characteristic of the distribution function Obj of the fluorescent dye indicates the distribution in a wide frequency band. On the other hand, the frequency characteristic of the point spread function PSF has the intensity only within the range of the frequency $\pm f_c$. It indicates the transfer of only the frequency component within the range of the frequency $\pm f_c$ to the image forming surface by the optical image forming system. Therefore, the frequency characteristic of the point spread function PSF is also referred to as a transfer function of an optical image forming system. Hereafter, the frequency $f_c$ is described as the cutoff frequency of the optical image forming system.

Accordingly, the frequency characteristic of the optical intensity distribution $I_{WF}$ of the sample image calculated by the equation (2) is limited to the frequency range of the cutoff frequency $\pm f_c$ as exemplified in FIG. 2B. Thus, in the conventional wide-field observation in which a sample surface is uniformly illuminated, the resolution of a sample image is limited by the cutoff frequency of an optical image forming system, and a sample image having the resolution exceeding the resolution limit of an optical image forming system cannot be generated.

On the other hand, in the SIM, for example, a sample surface is illuminated in the sine wave pattern indicated by the following equation (3) where $Ill_i(x)$ indicates the optical intensity distribution of the illuminating light on the sample surface, $f_0$ indicates the frequency of the illumination pattern, and $\phi_i$ indicates the phase of the illumination pattern at the origin of x=0. Hereafter, a one-dimensional model is described for simple explanation.

$$Ill_i(x) = \frac{1 + \cos[2\pi f_0 x + \phi_i]}{2} \quad (3)$$

When the Fourier transform is performed on the equation (3) to obtain the equation indicating the frequency characteristic, the equation (4) below is derived.

$$\tilde{Ill}_i(f) = \left\{ \frac{\delta(f)}{2} + \frac{\exp[j\phi_i]}{4} \cdot \delta(f - f_0) + \frac{\exp[-j\phi_i]}{4} \cdot \delta(f + f_0) \right\} \quad (4)$$

The optical intensity distribution $I_i(x)$ of a sample image on a image forming surface, which is generalized in view of an optical intensity distribution of an illumination light is expressed by the equation (5), and when the Fourier transform is performed on the equation (5) for transform into the equation indicating the frequency characteristic, the equation (6) below is derived.

$$I_i(x) = \{Ill_i(x) \times Obj(x)\} \otimes PSF(x) \quad (5)$$

$$\tilde{I}_i(f) = \{\tilde{Ill}_i(f) \otimes \tilde{Obj}(f)\} \times \tilde{PSF}(f) \quad (6)$$

Therefore, the optical intensity distribution $I_i$ on the image forming surface obtained in the SIM is expressed by the equation (7) where $P_0$, $P_+$, and $P_-$ respectively indicate the 0 order diffracted light component, the +1 order diffracted light component, and the −1 order diffracted light component of the optical intensity distribution on the image forming surface.

$$\tilde{I}_i(f) = \left\{ \frac{\tilde{Obj}(f)}{2} + \frac{\exp[j\phi_i]}{4} \cdot \tilde{Obj}(f - f_0) + \frac{\exp[-j\phi_i]}{4} \cdot \tilde{Obj}(f + f_0) \right\} \cdot \tilde{PSF}(f) \quad (7)$$

$$= \frac{\tilde{Obj}(f)\tilde{PSF}(f)}{2} + \frac{\exp[j\phi_i]}{4} \cdot \tilde{Obj}(f - f_0)\tilde{PSF}(f) +$$

$$\frac{\exp[-j\phi_i]}{4} \cdot \tilde{Obj}(f + f_0)\tilde{PSF}(f)$$

$$\equiv \frac{1}{2}\tilde{P}_0(f) + \frac{\exp[j\phi_i]}{4}\tilde{P}_+(f) + \frac{\exp[-j\phi_i]}{4}\tilde{P}_-(f)$$

As illustrated by the equation (7), the optical intensity distribution $I_i$ of the sample image on the image forming surface includes the ±1 order diffracted light component in addition to the 0 order diffracted light component by illuminating the sample surface by the sine wave pattern.

FIG. 3A exemplifies the frequency characteristic of each order diffracted light component on the sample surface generated by the sine wave illumination pattern and the point spread function of the optical image forming system. FIG. 3B exemplifies the frequency characteristic of each order diffracted light component on the image forming surface.

As exemplified in FIG. 3A, the frequency characteristic of the +1 order diffracted light component and the frequency characteristic of the −1 order diffracted light component on the sample surface are distributed respectively with the shift of the frequencies $f_0$ and $-f_0$ with respect to the frequency characteristic of the 0 order diffracted light component on the sample surface. However, the frequency characteristic of the optical intensity distribution on the image forming surface is a sum of the products of the frequency characteristic of each order diffracted light component and the frequency characteristic of the PSF of the optical image forming system on the sample surface. Therefore, the frequency characteristic of the optical intensity distribution of the sample image is limited to the frequency band within the range of the cutoff frequency±$f_c$ of the optical image forming system as in the case of uniform illumination as exemplified in FIG. 3B.

Then, in the SIM, each order diffracted light component on the image forming surface exemplified in FIG. 3B is individually calculated, and a super resolution image including the frequency exceeding the cutoff frequency $f_c$ is generated using the calculation results. Hereafter, the super resolution image obtained by the SIM is specifically described as a SIM reconstructed image.

Practically, using a plurality of sample images captured in different initial phases $\phi_i$, each order diffracted light component on the image forming surface is calculated by solving the simultaneous linear equations expressed by the each order diffracted light components $P_0$, $P_+$, and $P_-$ on the image forming surface as variables.

Next, the shifts of the frequencies with respect to the 0 order diffracted light component (hereafter referred to as an origin shift) is corrected for the ±1 order diffracted light component $P_+$ and $P_-$ among the calculated diffracted light components $P_0$, $P_+$, and $P_-$ on the image forming surface. Practically, as indicated by the equations (8) and (9), the frequencies are shifted by the frequencies $-f_0$ and $f_0$. FIG. 4 exemplifies each order diffracted light component after the origin shift. $P'_+$ and $P'_-$ indicate the ±1 order diffracted light component of the optical intensity distribution on the image forming surface after the origin shift.

$$\tilde{P}'_+(f) = \tilde{P}_+(f+f_0) = \tilde{Obj}(f) \cdot \tilde{PSF}(f+f_0) \quad (8)$$

$$\tilde{P}'_-(f) = \tilde{P}_-(f-f_0) = \tilde{Obj}(f) \cdot \tilde{PSF}(f-f_0) \quad (9)$$

Furthermore, the calculated 0 order diffracted light component is added to the product of the ±1 order diffracted light component after the origin shift and the weight w, thereby generating a SIM reconstructed image by the image processing.

The equation (10) indicates the frequency characteristic of the SIM reconstructed image. In the equation, $I_{SIM}$ indicates the intensity distribution of the SIM reconstructed image, and $PSF_{SIM}$ indicates the point spread function of the SIM reconstructed image.

$$\tilde{I}_{SIM}(f) \equiv \tilde{P}_0(f) + w\{\tilde{P}'_+(f) + \tilde{P}'_-(f)\} \quad (10)$$

$$= \tilde{P}_0(f) + w\{\tilde{P}_+(f+f_0) + \tilde{P}_-(f-f_0)\}$$

$$= [\tilde{PSF}(f) + w\{\tilde{PSF}(f+f_0) + \tilde{PSF}(f-f_0)\}] \cdot \tilde{Obj}(f)$$

$$\equiv \tilde{PSF}_{SIM}(f) \cdot \tilde{Obj}(f)$$

As illustrated in FIG. 5, the frequency characteristic of the point spread function $PSF_{SIM}$ of the SIM reconstructed image has the intensity within the range of the frequency band±($f_c+f_0$) obtained by adding the frequency $f_0$ of the illumination pattern to the cutoff frequency $f_c$ of the optical image forming system. That is, the cutoff frequency of the SIM reconstructed image is $f_c+f_0$, and the frequency band exceeding the cutoff frequency $f_c$ of the optical image forming system can be transferred.

Thus, according to the SIM, the frequency band exceeding the cutoff frequency of the optical image forming system can be transferred, and a sample image of super resolution exceeding the resolution limit of the optical image forming system can be generated. In addition, by changing the weight w, the visibility of the super resolution component exceeding the cutoff frequency of the optical image forming system can be adjusted.

Furthermore, International Publication Pamphlet No. WO 2007/043314 has disclosed the configuration arranging the spatial modulation element for generating structured illumination at an intermediate image position, and demodulating and capturing the intermediate image of a sample through the spatial modulation element.

SUMMARY OF THE INVENTION

The first aspect of the present invention provides a sample observation device including: an excitation light generation unit for generating excitation light for exciting a sample; an intermediate image forming unit for projecting the excitation light to the sample, and forming an intermediate image of the sample at an intermediate image position from observing light generated by illuminating the sample with the excitation light; a confocal modulation unit for modulating spatial intensity distributions of the excitation light and the intermediate image at the intermediate image position; a modulation drive unit for moving a modulation pattern of the confocal modulation unit relative to the intermediate image; an image relay unit for relaying on the image forming surface the intermediate image whose spatial intensity distribution has been modulated; an image pickup unit for converting the spatial intensity distribution of the intermediate image relayed on the image forming surface into digital image data; and an image processing unit for processing an image on the digital image data. The cutoff frequency of the image relay unit exceeds the cutoff frequency of the intermediate image forming unit. The Nyquist frequency of the image pickup unit exceeds the cutoff frequency of the intermediate image forming unit. The image processing unit performs a high frequency enhancing process for enhancing the high frequency component exceeding the cutoff frequency of the intermediate image forming unit.

BRIEF DESCRIPTION OF THE DRAWINGS

The present invention will be more apparent from the following detailed description when the accompanying drawings are referenced.

FIG. 1A is an explanatory view of the image-forming characteristic of an optical image forming system;

FIG. 1B is an explanatory view of the image-forming characteristic of an optical image forming system;

FIG. 4 exemplifies the frequency characteristic of each order diffracted light component after the origin shift;

FIG. 6 exemplifies the basic configuration of the sample observation device according to each embodiment of the present invention;

FIG. 8A exemplifies the configuration of the modulation pattern of the confocal modulation unit included in the sample observation device exemplified in FIG. 6;

FIG. 9A exemplifies another configuration of the modulation pattern of the confocal modulation unit included in the sample observation device exemplified in FIG. 6;

FIG. 10 exemplifies a further configuration of the modulation pattern of the confocal modulation unit included in the sample observation device exemplified in FIG. 6;

FIG. 14A exemplifies the configuration of the fluorescence microscope according to the embodiment 3;

FIG. 15A exemplifies the configuration of the fluorescence microscope according to the embodiment 4.

DESCRIPTION OF THE PREFERRED EMBODIMENTS

Figure 2A:
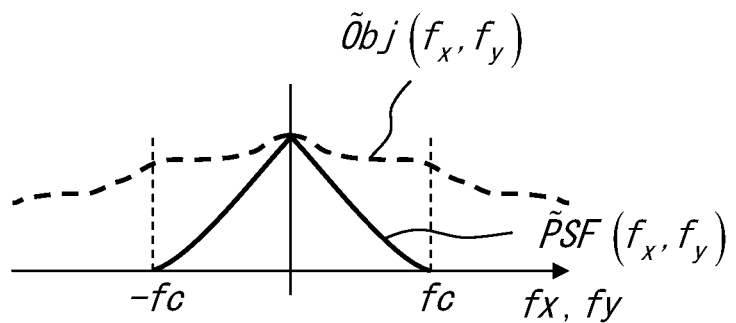
FIG. 2A exemplifies the frequency characteristics of the distribution function of fluorescent dye and the point spread function.
Figure 2B:
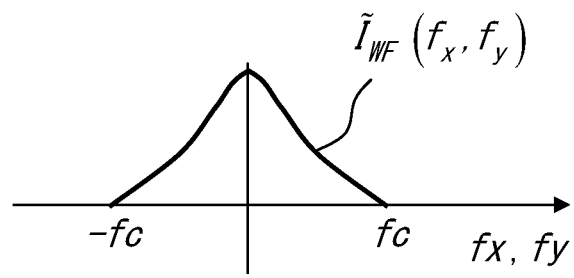
FIG. 2B exemplifies the frequency characteristic of the sample image obtained by the fluorescent sample and the optical image forming system having the characteristic illustrated in FIG. 2A.
Figure 3A:
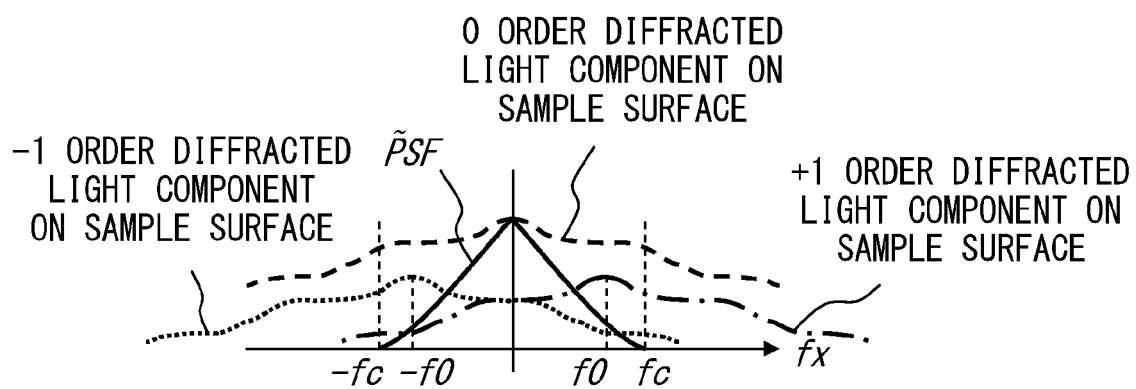
FIG. 3A exemplifies the frequency characteristic of each order diffracted light component on the sample surface generated by the sine wave illumination pattern and the point spread function.
Figure 3B:
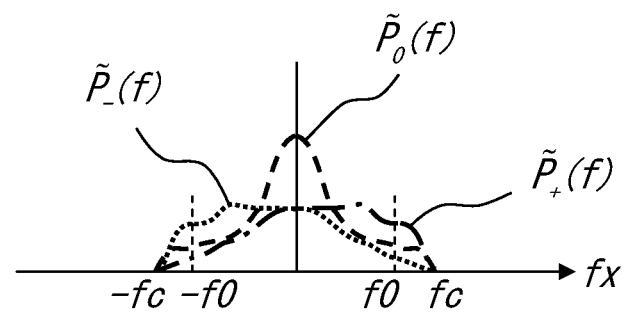
FIG. 3B exemplifies the frequency characteristic of each order diffracted light component on the image forming surface generated by the sine wave illumination pattern.
Figure 5:
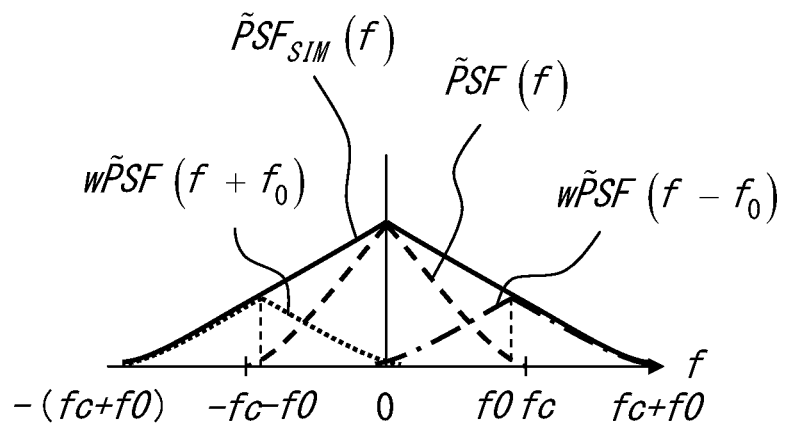
FIG. 5 exemplifies the frequency characteristic of the point spread function of the SIM reconstructed image.

FIG. 6 exemplifies the basic configuration of the sample observation device according to each embodiment of the present invention. First, the basic configuration of the sample observation device according to each embodiment of the present invention is described below with reference to FIG. 6.

The sample observation device exemplified in FIG. 6 is a fluorescence microscope 1 for observing a sample S as a fluorescent sample. The fluorescence microscope 1 includes: a light source 2 as an excitation light generation unit for generating excitation light for exciting a sample; an optical image forming system 3 as an intermediate image forming unit for projecting the excitation light to the sample, and forming an intermediate image of the sample at an intermediate image position from observing light generated by illuminating the excitation light to the sample; a scan mask 4 as a confocal modulation unit for modulating spatial intensity distributions of the excitation light and the intermediate image at the intermediate image position; a motor 5 as a modulation drive unit for moving a modulation pattern of the confocal modulation unit relative to the intermediate image; an image pickup lens 6 as an image relay unit for relaying on the image forming surface the intermediate image whose spatial intensity distribution has been modulated; an image pickup device 7 as an image pickup unit for converting the spatial intensity distribution of the intermediate image relayed on the image forming surface into digital image data; and a computer 8 as an image processing unit for processing an image on the digital image data.

The optical image forming system 3 includes an objective OB and a tube lens TL. The scan mask 4 is formed as a rotary disc which is rotated by the motor 5. The computer 8 includes a CPU 8a or an FPGA 8b. A half mirror HM is arranged at the position where the illumination path crosses the observation path. An illumination lens 9 is arranged between the light source 2 and the half mirror HM. The optical image forming system 3 and the image pickup lens 6 can have variable projection magnification and relay magnification.

The modulation pattern of the scan mask 4 is a cyclic pattern. The modulation pattern of the scan mask 4 moves relative to the intermediate image position by the scan mask 4 rotated by the drive of the motor 5.

The cutoff frequency of the image pickup lens 6 exceeds the cutoff frequency $f_c$ of the optical image forming system 3, and the Nyquist frequency of the image pickup device 7 exceeds the cutoff frequency $f_c$ of the optical image forming system 3. Note that the comparison among the cutoff frequency of the optical image forming system 3, the cutoff frequency of the image pickup lens 6, and the Nyquist frequency of the image pickup device 7 is performed using the frequency standardized by considering the projection magnification of the sample S on the intermediate image position and the projection magnification of the sample S on the image forming surface.

The computer 8 is configured so that the process of enhancing the high frequency component exceeding the cutoff frequency $f_c$ of the optical image forming system 3 (hereafter referred to as a high frequency enhancing process) can be performed on the digital image data acquired by the image pickup device 7.

The fluorescence microscope 1 with the above-mentioned configuration can record the super resolution component in the digital image data (hereafter referred to as an original image) acquired by the image pickup device 7. It is realized by the scan mask 4 as a confocal modulation unit demodulating the spatial intensity distribution of the observing light (intermediate image) generated from the sample S in addition to modulating the spatial intensity distribution of the excitation light while changing with time the modulation pattern by rotation.

Practically, first, the scan mask 4 modulates the spatial intensity distribution of the excitation light, thereby shifting a part of the high frequency component exceeding the cutoff frequency $f_c$ of the optical image forming system 3 in the frequency component of the observing light generated on the sample S in the wide-field observation to the frequency equal to or lower than the cutoff frequency $f_c$, and transferring shifted component to the intermediate image position by the optical image forming system 3. Afterwards, the scan mask 4 demodulates the spatial intensity distribution of the intermediate image, thereby reconstructing the component shifted to the frequency equal to or lower than the cutoff frequency $f_c$, transferring the component to the image forming surface by the image pickup lens 6, and converting the component to the digital image data by the image pickup device 7. Therefore, the super resolution component can be recorded on the original image.

In addition, using the fluorescence microscope 1, the computer 8 can perform the high frequency enhancing process to enhancing the super resolution component of the original image, thereby generating a super resolution image whose super resolution component, which has not been included in the digital image data in the wide-field observation, can be visualized. In the fluorescence microscope 1, it is not necessary that the image pickup device 7 acquires a plurality of original images to generate a super resolution image. Furthermore, as described later, the high frequency enhancing process performed by the computer 8 requires less computational effort, thereby realizing high speed image processing.

Therefore, the fluorescence microscope 1 can generate a super resolution image with high time resolution. Accordingly, a sample can be observed in real time. In addition, even when a relatively quickly moving sample is observed, the quality of the image is not degraded.

Described below in detail using equations is to record a super resolution component on an original image.

First considered is the case in which the scan mask 4 has the transmittance distribution M expressed by the equation (11) by which a cyclic pattern can be formed. In this case, "$f_n = n/p$" indicates the frequency specific to the modulation pattern, "p" indicates the pitch of the modulation pattern, "n" indicates the order of the frequency expansion, and "$x_0$" indicates the coordinates of the origin of the modulation pattern.

$$M(x; x_0) = \sum_n a_n \exp[j2\pi f_n(x - x_0)] \tag{11}$$

Assuming that each frequency component of the illumination stripes is $c_n$ times attenuated by the projection of the scan mask 4 to the sample surface, the optical intensity distribution Ill of the illuminating light on the sample surface is expressed by the equation (12), and the equation (13) is derived by performing the Fourier transform on the equation (12) and transforming into an equation indicating the frequency characteristic. In the incoherent illumination, the relation of $c_n = \tilde{P}SF(f_n)$ holds approximately.

$$Ill(x; x_0) = \sum_n a_n c_n \exp[j2\pi f_n(x - x_0)] \tag{12}$$

$$\tilde{Ill}(f; x_0) = \sum_n a_n c_n \exp[-j2\pi f_n x_0] \delta(f - f_n) \tag{13}$$

Therefore, the optical intensity distribution I of the intermediate image formed by the optical image forming system 3 is derived as the equation (14) using the equations (6) and (13).

$$\tilde{I}(f; x_0) = \sum_n a_n c_n \exp[-j2\pi f_n x_0] \tilde{Obj}(f - f_n) \tilde{P}SF(f) \tag{14}$$

$$\equiv \sum_n a_n c_n \exp[-j2\pi f_n x_0] \tilde{P}_n(f)$$

Furthermore, the optical intensity distribution I' of the intermediate image which has passed the scan mask 4 after the modulation by the scan mask 4 is expressed as a product of the optical intensity distribution I of the intermediate image before the modulation and the transmittance distribution M of the scan mask 4, and is expressed by the following equation (15).

$$I'(x; x_0) = I(x; x_0) \cdot M(x; x_0) = \tag{15}$$

$$\sum_{n'} \sum_n a_n c_n \exp[-j2\pi f_n x_0] P_n(x) \cdot a_{n'} \exp[j2\pi f_{n'}(x - x_0)]$$

If the modulation pattern of the scan mask 4 moves by 1 period p of the modulation pattern with respect to the intermediate image in the exposing time for acquisition of an image by the image pickup device, the optical intensity distribution $I_{Int}$ of the intermediate image after the modulation which is obtained in the period can be calculated by integrating the equation (15) by 1 period p.

With the integration, only the component satisfying the relationship of $f_n=-f_{n'}$, that is, n=−n', remains. Therefore, the optical intensity distribution $I_{Int}$ of the intermediate image after the modulation is expressed by the equation (16), and the equation (17) is derived by performing the Fourier transform on the equation (16) and transforming into the equation indicating the frequency characteristic.

$$I_{Int}(x) \approx \int_{x_0=0}^{p} I'(x; x_0) dx_0 \approx \sum_n a_n a_{n'} c_n \exp[-j2\pi f_n x] P_n(x) \quad (16)$$

$$\tilde{I}_{Int}(f) \approx \sum_n a_n a_{-n} c_n \tilde{P}_n(f-f_n) = \left\{ \sum_n a_n a_{-n} c_n \tilde{PSF}(f-f_n) \right\} \cdot \tilde{Obj}(f) \quad (17)$$

$$\equiv \tilde{PSF}_{Int}(f) \cdot \tilde{Obj}(f)$$

As indicated by the equation (17), the optical intensity distribution $I_{Int}$ of the intermediate image after the modulation can be regarded as the optical intensity distribution obtained by forming an image of the sample S having the distribution function Obj of the fluorescent dye using a virtual optical system having the point spread function $PSF_{Int}$. That is, the point spread function of the intermediate image after the modulation is a point spread function $PSF_{Int}$.

Figure 7A:
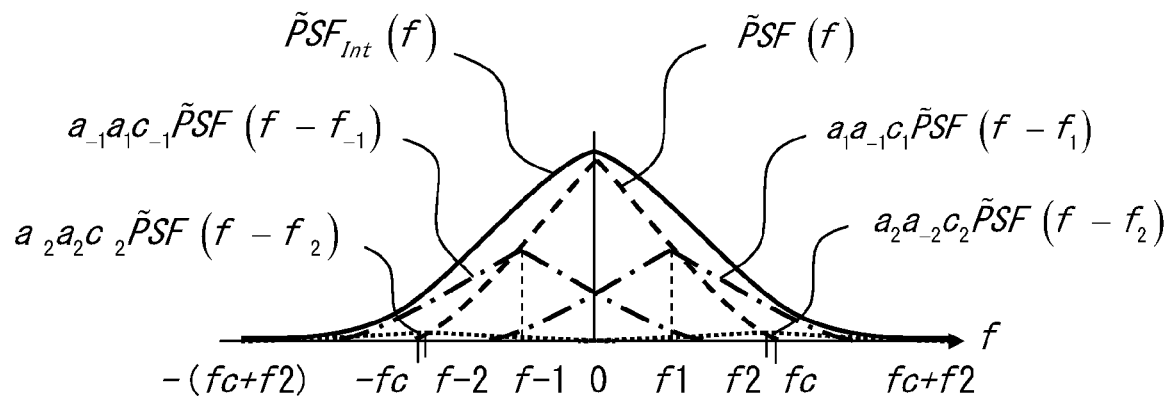
FIG. 7A exemplifies the frequency characteristic of the point spread function of the intermediate image after the modulation by the confocal modulation unit included in the sample observation device exemplified in FIG. 6.

FIG. 7A exemplifies the point spread function of the intermediate image after the modulation by the confocal modulation unit.

As illustrated in FIG. 7A, the frequency of each component $a_n a_{-n} c_n \tilde{PSF}(f-f_n)$ configuring the point spread function $PSF_{Int}$ of the intermediate image after the modulation is distributed in the position shifted by the frequency $f_n$ with respect to the frequency of the point spread function PSF of the optical image forming system. Therefore, the point spread function $PSF_{Int}$ as a total of the components has a frequency band larger than the point spread function PSF of the optical image forming system. Therefore, the cutoff frequency of the intermediate image after the modulation is higher than the cutoff frequency $f_c$ of the optical image forming system. Therefore, the fluorescence microscope 1 can record the super resolution component of the frequency exceeding the cutoff frequency $f_c$ of the optical image forming system on the original image.

The intermediate image after the modulation by the scan mask 4 is relayed on the image forming surface by the image pickup lens 6, and captured by the image pickup device 7. Therefore, whether or not the original image has a super resolution component depends on the cutoff frequency of the image pickup lens 6 and the Nyquist frequency of the image pickup device 7.

In the fluorescence microscope 1, as described above, the cutoff frequency of the image pickup lens 6 and the Nyquist frequency of the image pickup device 7 exceed the cutoff frequency $f_c$ of the optical image forming system 3. Therefore, the image pickup lens 6 and the image pickup device 7 can transmit the super resolution component exceeding the cutoff frequency $f_c$, and can record the super resolution component of the frequency exceeding the cutoff frequency $f_c$ of the optical image forming system 3 on the original image.

It is preferable that the cutoff frequency of the image pickup lens 6 is equal to or more than about 1.5 times of the cutoff frequency $f_c$ of the optical image forming system 3. Thus, an image included in the super resolution component of the frequency equal to or more than about 1.5 times the cutoff frequency $f_c$ of the optical image forming system can be formed on the image forming surface. In addition, it is preferable that the Nyquist frequency of the image pickup device 7 is equal to or more than about 1.5 times of the cutoff frequency $f_c$ of the optical image forming system 3. Thus, an image included in the super resolution component of the frequency equal to or more than about 1.5 times the cutoff frequency $f_c$ of the optical image forming system 3 can be formed on the original image. It is more preferable that the Nyquist frequency of the image pickup device 7 is equal to or lower than about four times the cutoff frequency $f_c$ of the optical image forming system 3. Since a larger Nyquist frequency reduces the pixel size, the loss of light quantity and the noise generally increase. Since the upper limit frequency of the super resolution component is logically double the cutoff frequency $f_c$, the Nyquist frequency is to be equal to or lower than double the frequency (that is, equal to or lower than four times the cutoff frequency $f_c$), thereby suppressing excess loss of light quantity or noise.

Exemplified above is the case in which a modulation pattern moves by one period p with respect to the intermediate image in the exposing time for acquisition of one image by the image pickup element, but relation between the time and the movement is not limited to this example. If the exposing time for acquisition of one image by the image pickup element is the time in which the modulation pattern moves by one period p or more with respect to the intermediate image, uneven luminance caused by the transmittance distribution of the modulation pattern in the original image is not outstanding. In addition, if the exposing time for acquisition of an image by the image pickup element is an integral multiple of the time in which the modulation pattern moves by one period p with respect to the intermediate image, then the uneven luminance caused by the transmittance distribution of the modulation pattern can be completely removed from the original image. The motor 5 as a modulation drive unit can adjust the movement speed of the modulation pattern depending on the exposing time for acquisition of one image by the image pickup device 7 so that the exposing time can be set freely to a certain extent.

Described next is the method of generating a super resolution image for which the super resolution component can be visualized from the original image. Hereafter, for simple explanation, the point spread function $PSF_{Int}$ of the intermediate image after the modulation by the scan mask 4 is explained as the point spread function of the original image.

As described above, using the fluorescence microscope 1, the super resolution component of the frequency exceeding the cutoff frequency $f_c$ of the optical image forming system can be recorded on the original image. That is, in the fluorescence microscope 1, the reconstructing process performed as image processing in the SIM for shifting the origin by calculating each diffracted light component is automatically performed by the optical system of the fluorescence microscope 1. However, the point spread function of the original image can transmit the frequency higher than the cutoff frequency $f_c$ of the optical image forming system with low contrast as exemplified in FIG. 7A. Therefore, the super resolution component recorded on the original image cannot be fully visualized as is.

Figure 7B:
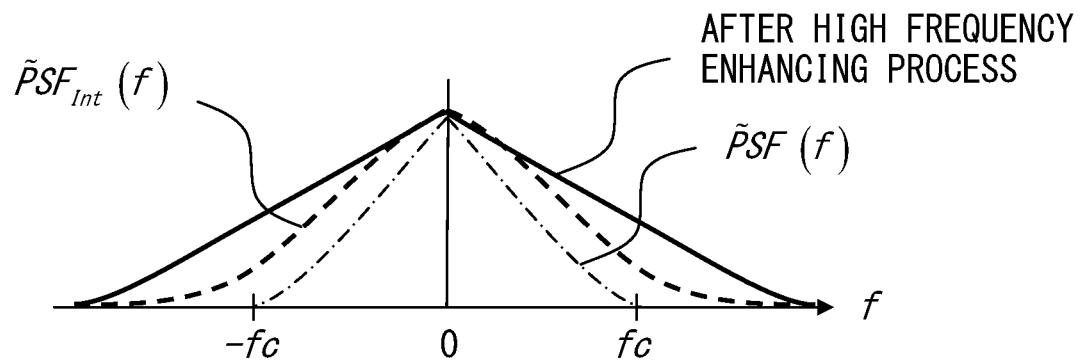
FIG. 7B is an explanatory view of the high frequency enhancing process performed by the image processing unit included in the sample observation device exemplified in FIG. 6.

Therefore, the computer 8 of the fluorescence microscope 1 performs the high frequency enhancing process. Practically, as illustrated in FIG. 7B, the high frequency component exceeding the cutoff frequency $f_c$ of the optical image forming system is enhanced relative to the low frequency component. Thus, a super resolution image whose super resolution component can be visualized can be generated.

Described below is a practical example of the high frequency enhancing process.

The following matrices A and B exemplify a 3×3 sharp filter and a 5×5 sharp filter, respectively.

$$A = \begin{bmatrix} 0 & -1 & 0 \\ -1 & 5 & -1 \\ 0 & -1 & 0 \end{bmatrix},$$

$$B = \begin{bmatrix} 0 & 0 & -1 & 0 & 0 \\ 0 & -6 & -20 & -6 & 0 \\ -1 & -20 & 127 & -20 & -1 \\ 0 & -6 & -20 & -6 & 0 \\ 0 & 0 & -1 & 0 & 0 \end{bmatrix} \times \frac{1}{19}$$

A sharp filter which enhances a high frequency component is generally widespread in the field of image processing. The high frequency enhancing process can be a convolution process in which the sharp filter expressed by matrices A and B is used as a kernel matrix.

The following matrix C exemplifies a 3×3 low pass filter.

$$C = \begin{bmatrix} 0 & 1 & 0 \\ 1 & 2 & 1 \\ 0 & 1 & 0 \end{bmatrix} \times \frac{1}{6}$$

The high frequency component is relatively enhanced by subtracting the low frequency component from the original image. Therefore, the high frequency enhancing process can be a process of subtracting from the original image an image obtained by operating a low pass filter such as the matrix C on the original image (hereafter referred to as a pseudo wide-field image). In addition, the pseudo wide-field image can be generated by the convolution process using a low pass filter as a kernel matrix. The process of generating a pseudo wide-field image, and subtracting the image from the original image can be performed as the convolution process to be once performed using a specified kernel matrix.

It is preferable that the above-mentioned convolution process is performed using the CPU 8a or the FPGA 8b included in the computer 8 for high-speed processing. Thus, a super resolution image can be displayed on a monitor etc. in real time.

In addition, the high frequency enhancing process can be a process of subtracting a wide-field image instead of a pseudo wide-field image from the original image. The wide-field image is an image acquired without performing the modulation by the scan mask 4 on the excitation light or the observing light, that is, an image captured without operating the scan mask 4, and the information about the frequency equal to or exceeding the cutoff frequency $f_c$ of the optical image forming system 3 is not included in the wide-field image. Therefore, by multiplying the wide-field image by an appropriate coefficient and subtracting the product from the original image, the high frequency component can be relatively enhanced. Furthermore, by setting the coefficient so that a defocusing component can be attenuated, an optically sectional image can also be acquired.

A typical example of the high frequency enhancing process can be the above-mentioned processes of using a sharp filter, subtracting an image obtained by operating a low pass filter from the original image, subtracting a wide-field image from the original image, etc., but is not limited to these processes. The high frequency component can be enhanced by other methods.

Described next is a practical example of a mask pattern of the scan mask 4. The mask pattern functions as a modulation pattern of the scan mask 4 when the scan mask 4 functions as a confocal modulation unit.

Figure 8B:
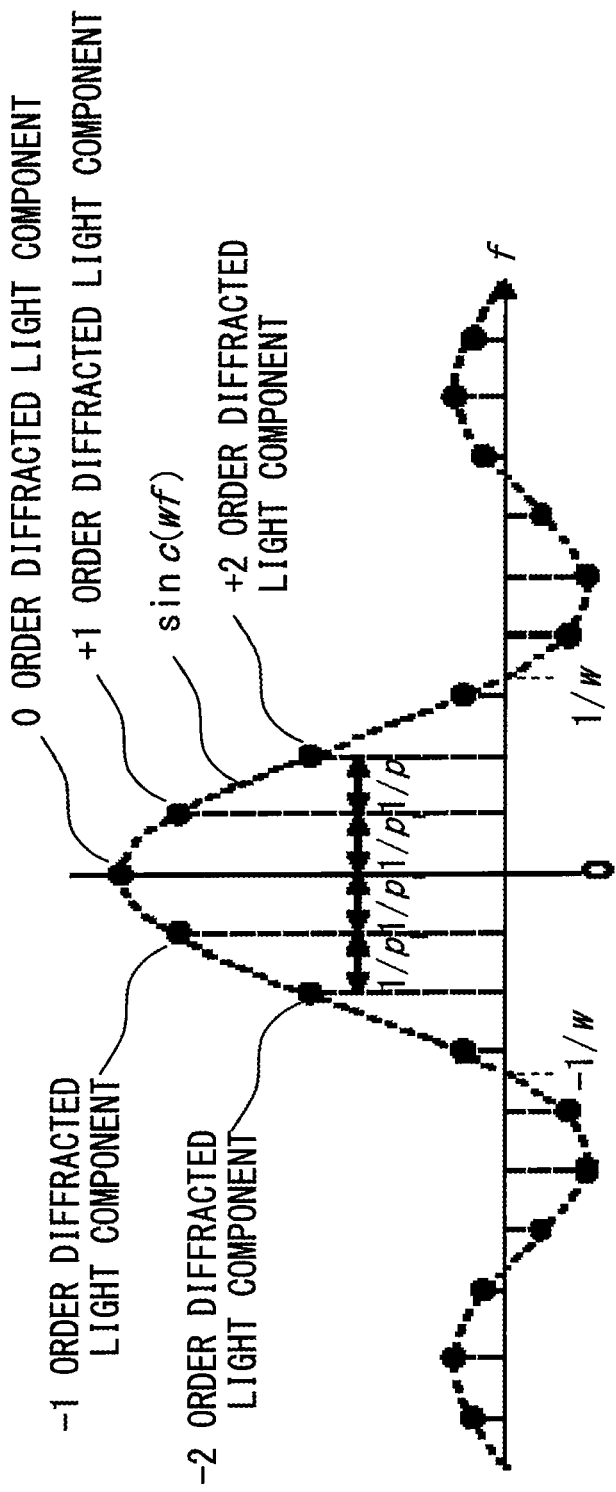
FIG. 8B exemplifies the frequency characteristic of the modulation pattern exemplified in FIG. 8A.
Figure 8C:
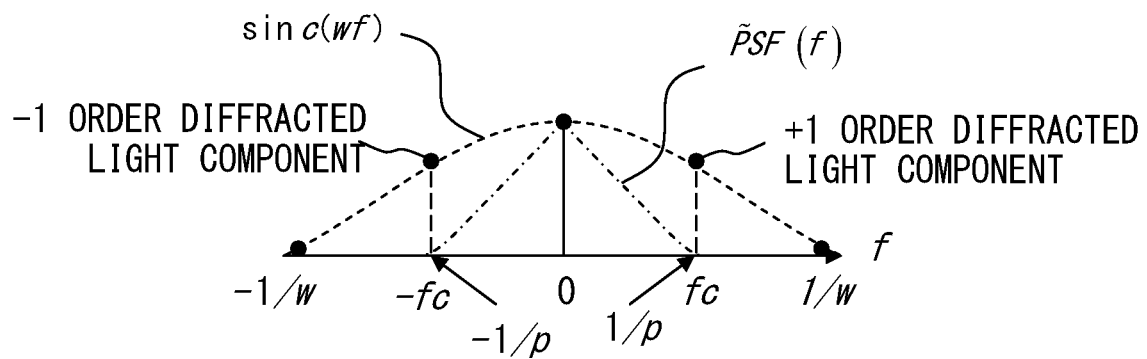
FIG. 8C exemplifies the relationship between the frequency characteristic of the modulation pattern exemplified in FIG. 8A and the frequency characteristic of the point spread function of an optical image forming system.

FIG. 8A exemplifies the configuration of the modulation pattern of the confocal modulation unit included in the sample observation device exemplified in FIG. 6. FIG. 8B exemplifies the frequency characteristic of the modulation pattern exemplified in FIG. 8A. FIG. 8C exemplifies the relationship between the frequency characteristic of the modulation pattern exemplified in FIG. 8A and the frequency characteristic of the point spread function of an optical image forming system.

The scan mask 4 as a confocal modulation unit can be a mask 10 having shielding units 10a and apertures 10b in periodically arranged slit form as exemplified in FIG. 8A, and can have a mask pattern of a line-and-space structure. Thus, the super resolution property can be provided in the direction of the short side of the slit. Since the direction of the short side of the slit is arbitrarily changed by the rotation of the mask 10, the super resolution property can be provided in an arbitrary direction by adjusting the amount of rotation of the scan mask within the exposing time.

As exemplified in FIG. 8A, when the apertures 10b having the aperture width w and formed between the shielding units 10a are periodically formed with the aperture period p, the mask pattern M(x) of the mask 10 is expressed by the following equation (18). The frequency characteristic of the mask pattern of the mask 10 is exemplified in FIG. 8B, and expressed by the equation (19) obtained by performing the Fourier transform on the equation (18). In the equation, rect (x) is defined by the equation (20), and is expressed by the equation (21) when processed by the Fourier transform. $\Delta_p(x)$ is defined by the equation (22), and expressed by the equation (23) when processed by the Fourier transform.

$$M(x) = rect\left(\frac{x}{w}\right) \otimes \Delta_p(x) \tag{18}$$

$$\tilde{M}(f) = wp \sum_{n=-\infty}^{\infty} \mathrm{sinc}\left(\frac{w}{p}n\right)\delta\left(f - \frac{n}{p}\right) \tag{19}$$

$$rect(x) \equiv \begin{cases} 1 & \left(|x| < \frac{1}{2}\right) \\ \frac{1}{2} & \left(|x| = \frac{1}{2}\right) \\ 0 & \left(|x| > \frac{1}{2}\right) \end{cases} \tag{20}$$

$$\tilde{rect}(f) = \mathrm{sinc}(f) = \frac{\sin(\pi f)}{\pi f} \tag{21}$$

$$\Delta_p(x) \equiv \sum_{n=-\infty}^{\infty} \delta(x - np) \tag{22}$$

$$\tilde{\Delta}_p(f) = p \sum_{n=-\infty}^{\infty} \delta\left(f - \frac{n}{p}\right) \tag{23}$$

As illustrated by the equation (19) and FIG. 8B, the frequency characteristic of the mask pattern includes the ±n order diffracted light component in the frequency shifted by ±n/p with respect to the 0 order diffracted light component. Therefore, to allow the illuminating light to include a strong diffracted light component around the cutoff frequency $f_c$ of the optical image forming system 3, it is preferable that the aperture width w and the cutoff frequency $f_c$ of the optical image forming system 3 satisfy the relationship of $w \ll 1/f_c$. However, when the aperture width w becomes smaller than a half of the period regulated by the cutoff frequency $f_c$ of the optical image forming system 3, that is $1/(2f_c)$, the loss of light quantity by the confocal effect greatly increases, thereby degrading the S/N ratio. Therefore, it is preferable that the aperture width w is equal to or exceeds the half $1/(2f_c)$ of the period regulated by the cutoff frequency $f_c$ of the optical image forming system 3. Especially, it is preferable that the width is about the period $1/(2f_c)$.

In addition, as exemplified in FIG. 8C, it is necessary to satisfy the relationship of $p > 1/f_c$ between the aperture period p and the cutoff frequency $f_c$ of the optical image forming system 3 to transmit the ±1 order diffracted light component by the optical image forming system 3 and form a stripe pattern (mask pattern) on the sample S. That is, it is necessary that the aperture period p is longer than the period $1/f_c$ regulated by the cutoff frequency $f_c$ of the optical image forming system 3. However, since the aperture period p is inversely proportional to the aperture efficiency of the mask pattern, the illumination efficiency is degraded if the aperture period p is too large. Accordingly, in the application in which the illumination efficiency is highly valued, it is preferable that the aperture period p is nearly double the period $1/f_c$ regulated by the cutoff frequency $f_c$ of the optical image forming system 3. On the other hand, if the relationship of $p \gg 1/f_c$ is satisfied, the optical sectioning effect is applied. Therefore, it is preferable that the aperture period p is equal to or exceeds ten times the period $1/f_c$ regulated by the cutoff frequency $f_c$ of the optical image forming system 3 in the specific application in which the optical sectioning effect is requested. It is further preferable that the aperture period p is equal to or exceeds ten times and is equal to or lower than twenty times the period $1/f_c$ regulated by the cutoff frequency $f_c$ of the optical image forming system 3.

When the mask 10 including the shielding unit 10a as exemplified in FIG. 8A is used as a confocal modulation unit, it is preferable to include, between the light source 2 and the mask 10 (scan mask 4), a cylindrical lens for which the aperture 10b is located at the condensation position of a cylindrical lens. Furthermore, it is preferable that the motor 5 is configured so that the cylindrical lens and the mask 10 can be moved without changing their relative positions. Thus, the loss of light quantity of the excitation light generated by the light entering the shielding unit 10a can be suppressed, and a larger amount of excitation light can be illuminated on the sample S.

Figure 9B:
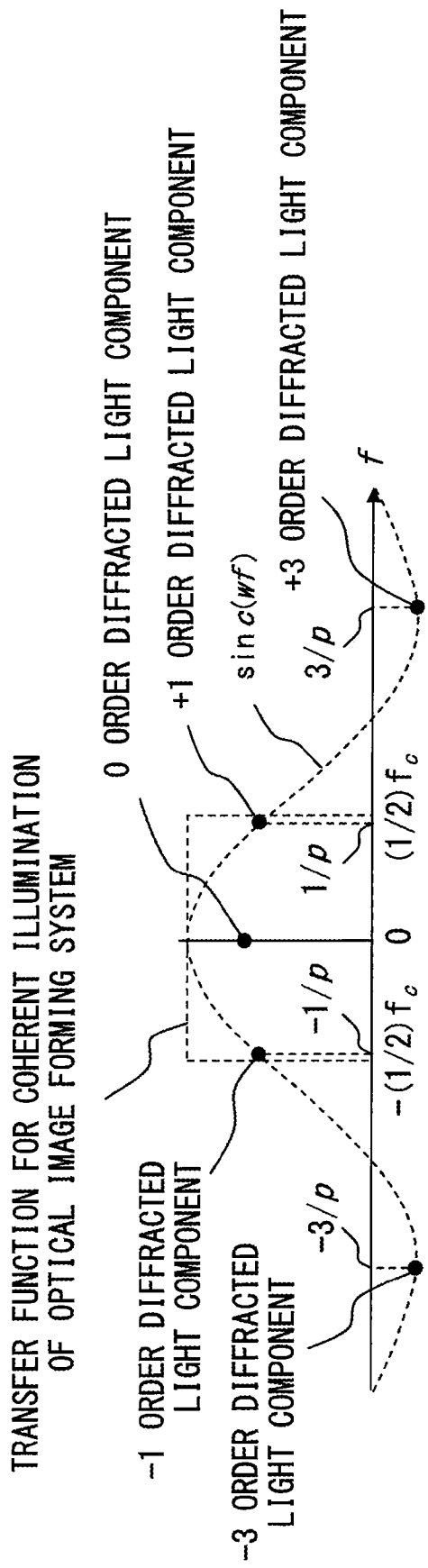
FIG. 9B exemplifies the frequency characteristic of the modulation pattern exemplified in FIG. 9A and the transfer function of the optical image forming system on the coherent illumination.

FIG. 9A exemplifies another configuration of the modulation pattern of the confocal modulation unit included in the sample observation device exemplified in FIG. 6. FIG. 9B exemplifies the frequency characteristic of the modulation pattern exemplified in FIG. 9A and the transfer function of the optical image forming system on the coherent illumination.

A mask 11 exemplified in FIG. 9A is different from the mask 10 exemplified in FIG. 8A in that a phase shift film unit 11a replaces the shielding unit 10a. The phase shift film unit 11a is obtained by forming on the mask substrate an evaporation film whose intensity transmittance is about 6% and the transmittance phase difference from an aperture 11b is about ½ of the available wavelength.

When the mask 11 including the phase shift film unit 11a is used as a confocal modulation unit, the light which has transmitted through the phase shift film unit 11a can interfere with the light which has transmitted through the aperture 11b by using a light source having high coherence such as a laser etc. or by using a smaller numerical aperture for illumination of the mask 11. Thus, as exemplified in FIG. 9B, In regard to each order diffracted light component generated by the mask pattern, the intensity of the 0 order diffracted light component is reduced, and the intensity of the frequency component around the cutoff frequency $f_c$ of the optical image forming system 3 is relatively enhanced, thereby improving the contrast of the stripe pattern formed on the sample S.

On the other hand, the cutoff frequency of the optical image forming system 3 with respect to the coherent illumination is a half ($f_c/2$) of the cutoff frequency $f_c$ of the optical image forming system 3 with respect to the incoherent illumination, but it is equal to double the frequency $f_c$ if a conversion is made into the spatial frequency of the excitation intensity to the sample. In addition, the point spread function of the optical image forming system 3 with respect to the coherent illumination has the characteristic of transmitting the frequency component equal to or lower than the cutoff frequency ($f_c/2$) with contrast 1. Therefore, the coherent illumination can project the stripe pattern on the sample S with higher contrast than the incoherent illumination after the conversion to intensity.

Especially, with the mask 11 satisfying the relationship of $p=2w$ between the aperture period p and the aperture width w, when the aperture period p and the cutoff frequency $f_c$ satisfies the relationship of $1/p > f_c/2$, the ±1 order diffracted light component is almost 100% transmitted on the sample by the optical image forming system 3 as exemplified in FIG. 9B. Therefore, the stripe pattern can be projected on the sample S with high contrast. Accordingly, since the ratio of the high frequency component contributing to the formation of an intermediate image increases, the degree of the enhancement of the high frequency component by the computer 8 can be reduced, thereby suppressing the generation of the noise in the image processing.

FIG. 10 exemplifies a further configuration of the modulation pattern of the confocal modulation unit included in the sample observation device exemplified in FIG. 6.

As exemplified in FIG. 10, the scan mask 4 as a confocal modulation unit can be a mask 12 having a shielding unit 12a and an aperture 12b in pinhole form arranged periodically, and can have a mask pattern in a so-called two-dimensional grating structure. Thus, the super resolution property can be provided isotropically on the XY plane exemplified in FIG. 10. To be more practical, as exemplified in FIG. 10, the super resolution property can be provided isotropically on the XY plane by moving the mask 12 in the X-axis direction because the Y-axis direction the position of the aperture 12b is different from the Y-axis direction the positions of the apertures adjacent in the X-axis direction.

In the mask pattern having the two-dimensional grating structure exemplified in FIG. 10, the relationship between the aperture width $w_x$ in the X-axis direction and the aperture period $p_x$ in the X-axis direction and the relationship between the aperture width $w_y$ in the Y-axis direction and the aperture period $p_y$ in the Y-axis direction of the aperture 12b are the same as the relationship between the aperture width w and the aperture period p of the aperture 10b of the mask pattern having the line-and-space structure exemplified in FIG. 8A. Therefore, for the same reason as the case of the mask 10, it is preferable that the dimensions of the aperture 12b (aperture width $w_x$ and aperture width $w_y$) are equal to or exceed the half $1/(2f_c)$ of the period regulated by the cutoff frequency of the optical image forming system 3, and it is more preferable that they are about the period $1/(2f_c)$. Similarly, for the same reason as the case of the mask 10, it is necessary that the aperture period $p_x$ and the aperture period $p_y$ are longer than the period $1/f_c$ regulated by the cutoff frequency of the optical image forming system 3, and in the application in which the illumination efficiency is highly regarded, it is preferable that the aperture period $p_x$ and the aperture period $p_y$ are nearly double the period $1/f_c$ regulated by the cutoff frequency $f_c$. However, in the specific application in which the optical sectioning effect is requested, it is preferable that the aperture period $P_x$ and the aperture period $p_y$ are equal to or exceed triple the period $1/f_c$ regulated by the cutoff frequency $f_c$.

In FIG. 10, the shape of the aperture 12b is square, but it is not limited to a square. For example, the shape of the aperture 12b can be circular. The mask 12 can include a phase shift film unit as exemplified in FIG. 9A instead of the shielding unit 12a. In addition, a microlens array having a condensing position at the aperture 12b can be provided between the light source 2 and the mask 12, and the motor 5 can be configured so that the microlens array and the mask 12 can be moved without changing their relative positions.

In FIG. 6, the mask functioning as a confocal modulation unit is formed in the rotary disc, but the present invention is not limited to this configuration. For example, the mask functioning as a confocal modulation unit can be formed in a rotary drum instead of the rotary disc. In addition, a vibrator can be arranged instead of the motor to form a mask on a plate which is vibrated by the vibrator.

Generally, when a mask is formed on the rotary disc or the rotary drum which can be rotated by a motor, the time required for the movement of the period p of the modulation pattern can be relatively short. Therefore, it is preferable because an original image can be generated by the image pickup device 7 at a high speed. On the other hand, when a mask is formed on the plate which is vibrated by the vibrator, it is preferable because the confocal modulation unit and the modulation drive unit can be compactly configured.

Furthermore, the fluorescence microscope 1 can be configured by including in advance a plurality of masks having different modulation patterns, selecting an arbitrary mask from among the plurality of masks, and inserting a selected mask into an optical path. For example, the mask can be arranged as replaceable on the rotary disc etc. Thus, depending on the change of the cutoff frequency of the optical image forming system 3 by changing the wavelength of excitation light, the projection magnification to the intermediate image position, etc., the super resolution property can be optimized.

Furthermore, a spatial light modulator can replace the mask as a confocal modulation unit. In this case, as a modulation drive unit, a drive circuit for driving the spatial light modulator replaces the motor. By using the spatial light modulator as a confocal modulation unit, an arbitrary modulation pattern can be formed, thereby optimizing the modulation pattern depending on the change of the wavelength of the excitation light, the projection magnification to the intermediate image position, etc. The spatial light modulator can be a DMD and an LCOS. If the spatial light modulator is a DMD, the modulation pattern can be changed at a higher speed. On the other hand, if the spatial light modulator is an LCOS, the excitation light can be phase modulated.

Described concretely below is each embodiment.

Embodiment 1

Figure 11A:
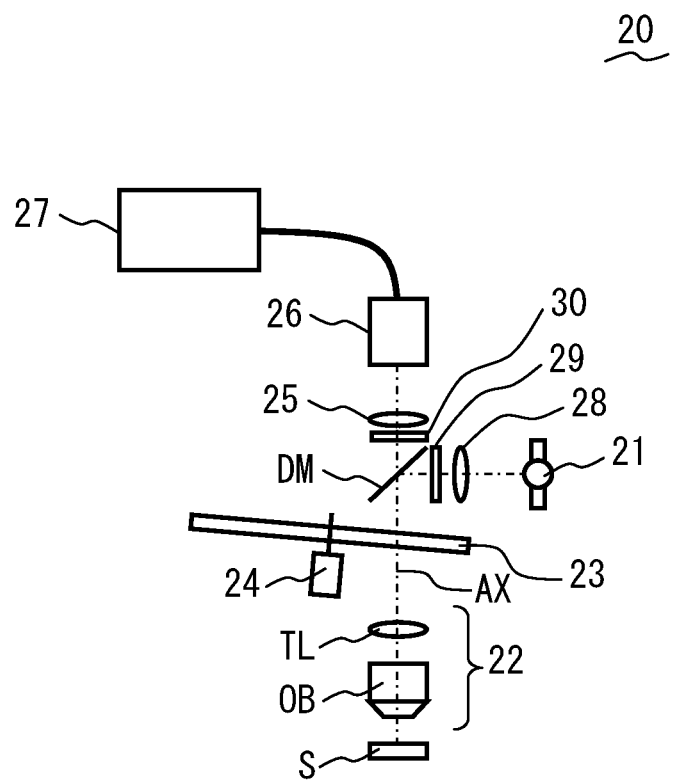
FIG. 11A exemplifies the configuration of the fluorescence microscope according to the embodiment 1.
Figure 11B:
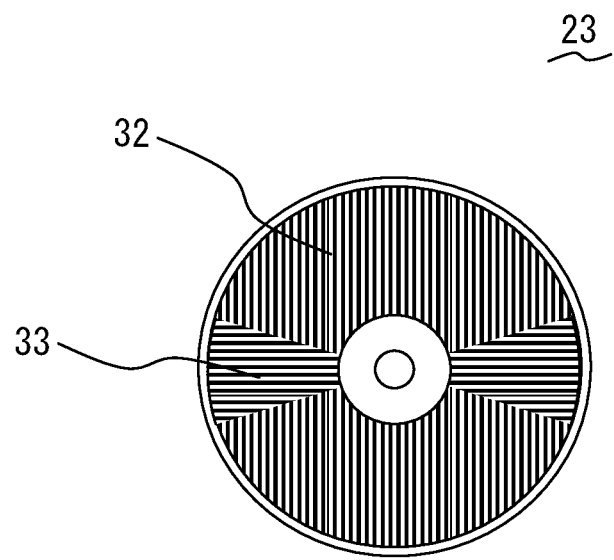
FIG. 11B is an explanatory view of a mask pattern of a mask included in the fluorescence microscope exemplified in FIG. 11A.
Figure 11C:
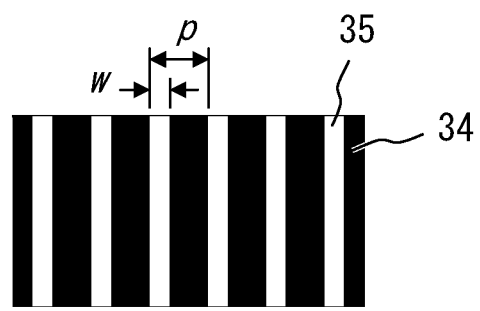
FIG. 11C is an explanatory view of the details of the mask pattern of the mask exemplified in FIG. 11B.

FIG. 11A exemplifies the configuration of the fluorescence microscope according to the present embodiment. FIG. 11B is an explanatory view of a mask pattern of a mask included in the fluorescence microscope exemplified in FIG. 11A. FIG. 11C is an explanatory view of the details of the mask pattern of the mask exemplified in FIG. 11B.

A fluorescence microscope 20 exemplified in FIG. 11A is a sample observation device, and includes: a mercury lamp 21 for generating the excitation light for exciting a sample S; an optical image forming system 22 for forming an intermediate image of the sample S at the intermediate image position from the observing light generated by projecting the excitation light to the sample S and illuminating the sample S with the excitation light; a mask 23 formed as a rotary disc for modulating the spatial intensity distributions of the excitation light and the intermediate image at the intermediate image position; a motor 24 for moving the modulation pattern of the mask 23 relative to the intermediate image; an image pickup lens 25 for relaying to the image forming surface the intermediate image whose spatial intensity distribution has been modulated; a cooled CCD 26 for converting the spatial intensity distribution of the intermediate image relayed on the image forming surface into digital image data; and a computer 27 for performing image processing on the digital image data.

The rotary disc is made of quartz glass or transparent glass one surface of which has a cyclic pattern as illustrated in FIG. 11B. Thus, the rotary disc functions as the mask 23 for modulating the spatial intensity distribution. The mask 23 has a line-and-space pattern with the aperture period p formed by shielding units 34 and apertures 35 having the aperture width w, and formed by etching the low reflective chrome coat on the rotary disc. However, the mask 23 includes a first area 32 and a second area 33 having different line directions as exemplified in FIG. 11B so that the line directions do not match the rotation direction of the rotary disc.

The fluorescence microscope 20 further includes an illumination lens 28 and a fluorescent cube having an exciting filter 29, a blocking filter 30, and a dichroic mirror DM. The optical image forming system 22 also includes an objective OB and a tube lens TL.

The resolution of the optical image forming system 22 is $\lambda/(2NA)$ where NA indicates the numerical aperture of the objective OB, and $\lambda$ indicates the wavelength relating to image forming. Therefore, the cutoff frequency $f_c$ of the optical image forming system 22 on the cooled CCD 26 is $f_c=2NA/(\lambda M\beta)$ where M indicates the projection magnification of the optical image forming system 22 and $\beta$ indicates the projection magnification of the image pickup lens 25.

In this example, the projection magnification $\beta$ of the image pickup lens 25 is set so that the Nyquist frequency $1/(2\Delta)$ determined by the pixel pitch $\Delta$ of the cooled CCD 26 can be almost double the cutoff frequency $f_c$ of the optical image forming system 22. The projection magnification $\beta$ of the image pickup lens 25 can be set so that the Nyquist frequency of the cooled CCD 26 exceeds the cutoff frequency $f_c$ of the optical image forming system 22, and it is more preferable that the magnification is equal to or exceeds 1.5 times and is lower than four times the cutoff frequency $f_c$.

The cutoff frequency of the image pickup lens 25 also exceeds the cutoff frequency of the optical image forming system 22.

The aperture width w of the aperture 35 is set to be $2\Delta/\beta$ approximately. Since the equation $1/(2\Delta)=2f_c$ in the fluorescence microscope 20, the aperture width w of the aperture 35 is $1/(2f_c\beta)$. That is, the value is preferable because it is about a half of the period regulated by the cutoff frequency $f'_c(=f_c\beta)$ of the optical image forming system 22 at the intermediate image position.

The pattern frequency $(1/p)$ is set so that it can be lower than the cutoff frequency $f'_c$ of the optical image forming system 22 for the wavelength of the excitation light in the intermediate image position. That is, the period p is longer than the period $1/f'_c$ regulated by the cutoff frequency $f'_c$ of the optical image forming system 22 for the wavelength of the excitation light at the intermediate image position. Therefore, it is preferable because the excitation light having the spatial intensity distribution caused by the mask pattern can be projected on the sample.

It is preferable that the tube lens TL is an optical variable magnification system or an optical zoom system so that the projection magnification M can be changed depending on the change of the objective OB and the fluorescent wavelength. It is also preferable that the image pickup lens 25 is an optical variable magnification system or an optical zoom system so that the projection magnification β can be changed depending on the change of the objective OB and the fluorescent wavelength. In addition, masks having different modulation patterns can be arranged as replaceable on the rotary disc. It is also possible that a rotary disc provided with masks having different modulation patterns is arranged as replaceable.

In the fluorescence microscope 20, an intermediate image of a sample S which has passed the pattern of the mask 23 formed as a rotary disc by the cooled CCD 26 is picked up while rotating the rotary disc by the motor 24. The exposing time is at least the time required for the pattern of the mask 23 to move in the period p, and it is preferable that the time exceeds the rotating time required for the ½ rotation of the rotary disc functioning as the mask 23. The exposing time can be an integral multiple of the time required for movement in the period p. It is preferable that the rotation speed of the motor 24 is variable.

The original image captured by the cooled CCD 26 is transmitted as digital image data to the computer 27 where digital processing is performed for high frequency enhancement.

Practically, the d computer 27 enhances the high frequency component exceeding the cutoff frequency of the optical image forming system 22 on the digital image data generated by the cooled CCD 26. For the digital processing, it is preferable to use a convolution filter, more preferable to use a sharp filter having a kernel exceeding 3×3, and further preferable to use a sharp filter having a kernel exceeding 5×5. The high frequency component can be enhanced in other methods.

Using the fluorescence microscope 20 of the present embodiment, a super resolution image can be generated with high time resolution, and a sample S can be observed in real time.

Figure 12:
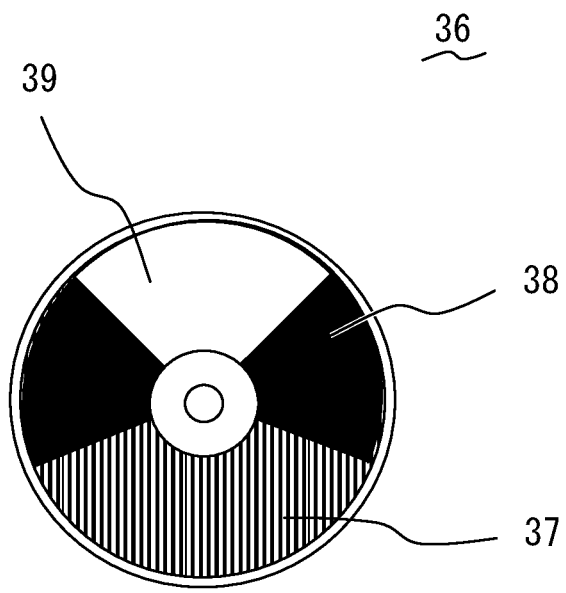
FIG. 12 is an explanatory view of a variation example of the mask pattern of the mask included in the fluorescence microscope exemplified in FIG. 11A.

FIG. 12 is an explanatory view of a variation example of the mask pattern of the mask included in the fluorescence microscope exemplified in FIG. 11A.

A mask 36 exemplified in FIG. 12 is different from the mask 23 in that a shielding area 38 and an aperture area 39 are included in addition to a line pattern area 37 corresponding to the first area 32 or the second area 33 of the mask 23.

In the fluorescence microscope according to the present variation example different from the fluorescence microscope 20 only in that the mask 36 is included instead of the mask 23, when there is the line pattern area 37 on the optical axis AX, an original image including a super resolution component (hereafter referred to as a confocal image) is acquired, and when there is the aperture area 39 on the optical axis AX, a wide-field image is acquired. When there is the shielding area 38 on the optical axis AX, no image is acquired. The shielding area 38 is provided for apparent discrimination between the period in which a confocal image is generated and the period in which a wide-field image is generated. In the computer 27, a process of subtracting the wide-field image from the acquired confocal image is performed as digital processing for high frequency enhancement.

Using the fluorescence microscope according to the present variation example, as with the fluorescence microscope 20 according to the present embodiment, a super resolution image can be generated with high time resolution. Therefore, a sample S can be observed in real time.

Furthermore, using the fluorescence microscope according to the present variation example, an optical sectioning effect can also be acquired by adjusting the intensity ratio between the acquired confocal image and the wide-field image so that the intensity of the defocus image can be nearly zero.

In addition, using the fluorescence microscope according to the present variation example, the wide-field image and the original image can be acquired by the same cooled CCD 26. Therefore, images having the identical positions can be acquired without aligning the images. Furthermore, the difference in time is small between when the wide-field image is acquired and when the original image is acquired. Therefore, the generation of an artifact when a sample is moved can be suppressed.

The technique of providing a modulation unit at the intermediate image position has been used in he confocal microscope etc., and has been disclosed by, for example, National Publication of International Patent Application No. 2002-535716 etc. However, the fluorescence microscope according to the present application is clearly different from the conventional confocal microscope using a modulation unit for acquiring a confocal effect in that the modulation unit is used in acquiring a super resolution component.

Embodiment 2

Figure 13A:
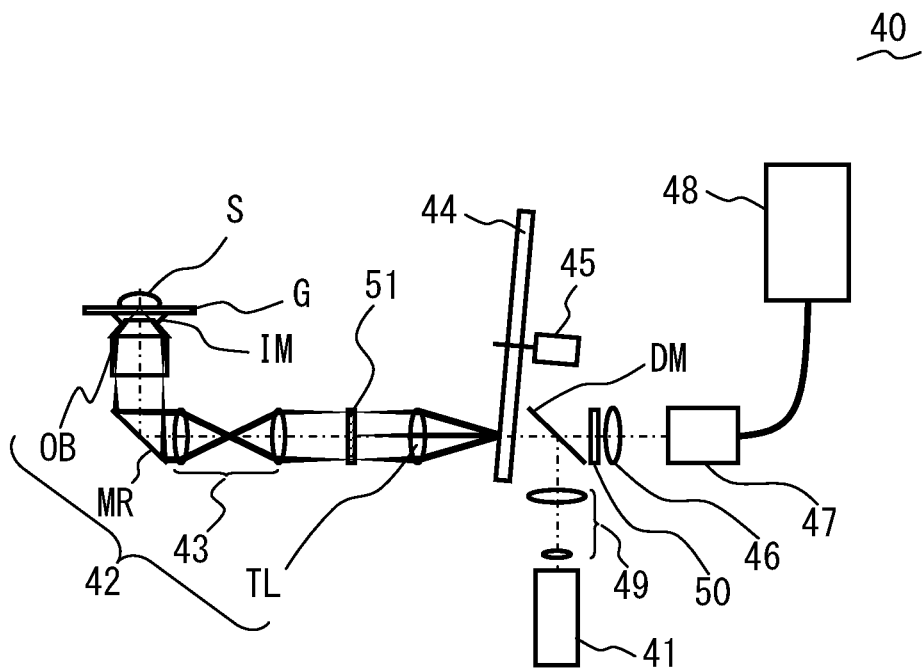
FIG. 13A exemplifies the configuration of a total internal reflection fluorescence microscope according to the embodiment 2.
Figure 13B:
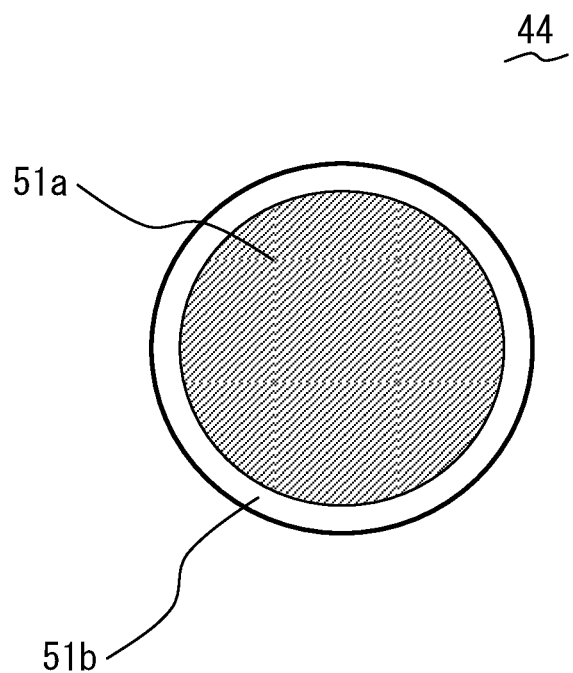
FIG. 13B is an explanatory view of the configuration of the concentric dichroic filter included in the total internal reflection fluorescence microscope exemplified in FIG. 13A.

FIG. 13A exemplifies the configuration of a total internal reflection fluorescence (TIRF) microscope according to the embodiment 2. FIG. 13B is an explanatory view of the configuration of the concentric dichroic filter included in the total internal reflection fluorescence microscope exemplified in FIG. 13A.

A total internal reflection fluorescence microscope 40 exemplified in FIG. 13A is a sample observation device, and includes: a laser 41 for generating excitation light for exciting a sample S; an optical image forming system 42 for projecting the excitation light to the sample S, and forming an intermediate image of the sample S at an intermediate image position from observing light generated by illuminating the sample S with the excitation light; a mask 44 formed as a rotary disc and modulating spatial intensity distributions of the excitation light and the intermediate image at the intermediate image position; a motor 45 for moving a modulation pattern of the mask 44 relative to the intermediate image; an image pickup lens 46 for relaying the intermediate image whose spatial intensity distribution has been modulated to the image forming surface; an EM-CCD 47 for converting the spatial intensity distribution of the intermediate image relayed on the image forming surface into digital image data; and a computer 48 for performing image processing on the digital image data. The mask 44 is a diffraction grating having a cyclic pattern.

The total internal reflection fluorescence microscope 40 includes a beam expander 49, a dichroic mirror DM, and a blocking filter 50. The optical image forming system 42 includes an objective OB, a mirror MR, a pupil relay optical system 43 for relaying the pupil of the objective OB, and a tube lens TL.

The total internal reflection fluorescence microscope 40 further includes a concentric dichroic filter 51 located near the position conjugate with the pupil position of the objective OB as a annular illumination unit for annularly illuminating the sample S with excitation light. The concentric dichroic filter 51 includes an excitation light block area 51a for blocking the excitation light and transmitting fluorescence, and a transmittance area 51b for transmitting the excitation light and the fluorescence, as exemplified in FIG. 13B. The excitation light block area 51a occupies the central portion of the pupil conjugate position, and the transmittance area 51b occupies the peripheral portion of the pupil conjugate position. Therefore, the excitation light entering the central portion of the pupil position of the objective OB is blocked by the excitation light block area 51a while the excitation light entering the peripheral portion of the pupil position of the objective OB passes through the transmittance area 51b. Thus, the annular illumination can be realized by the concentric dichroic filter 51.

The objective OB is an immersion objective, and the space between the slide glass G supporting the sample S and the objective OB is filled with immersion oil IM. The slide glass G and the immersion oil IM has a refractive index higher than that of the medium surrounding the sample S. That is, a transparent object having the refractive index higher than that of the medium surrounding the sample S is included between the sample S and the optical image forming system 42. The medium surrounding the sample S can be, for example, water etc. when the sample S is a cultured cell. If the sample S is a fixed sample, it can be, for example, paraffin etc.

The concentric dichroic filter 51 as an annular illumination cuts off a part of the excitation light so that the excitation light can enter the interface at an angle at which more than 90% of the excitation light which has entered the interface between the sample S and the immersion oil IM can be totally reflected. That is, the dimensions of the excitation light block area 51a and the transmittance area 51b are adjusted. Thus, the TIRF illumination can be realized by the concentric dichroic filter 51.

Other points are similar to those of the fluorescence microscope 20 according to the embodiment 1. For example, the cutoff frequency of the optical image forming system 42, the cutoff frequency of the image pickup lens 46, the Nyquist frequency of the EM-CCD 47, and the aperture width w and the aperture period p of the pattern of the diffraction grating formed by the mask 44 have the characteristics similar to those of the fluorescence microscope 20 according to the embodiment 1.

In the total internal reflection fluorescence microscope 40, the excitation light generated by the laser 41 is divided into a plurality of diffracted light components by the diffraction grating formed by the mask 44 after the beam diameter is expanded by the beam expander 49. Since the angle of the excitation light which enters the interface between the slide glass G and the sample S is restricted by the concentric dichroic filter 51 arranged near the pupil conjugate position of the objective OB, the excitation light emitted to the sample S becomes the TIRF illumination light more than 90% of which is totally reflected by the interface between the slide glass G and the sample S. Therefore, in the total internal reflection fluorescence microscope 40, the sample in the evanescent area near the slide glass G is excited.

Since the fluorescence is not blocked by the concentric dichroic filter 51, it is demodulated by the confocal modulation unit (mask 44) as with the fluorescence microscope 20 according to the embodiment 1, and the original image including the super resolution component is acquired by the EM-CCD 47. Furthermore, the high frequency enhancing process is performed in the computer 48.

Therefore, using the total internal reflection fluorescence microscope 40 according to the present embodiment, the super resolution image can be generated with high time resolution as with the fluorescence microscope 20 according to the embodiment 1. Therefore, the sample S can be observed in real time.

Since the annular illumination is realized by the concentric dichroic filter 51 in the total internal reflection fluorescence microscope 40, the stripe pattern generated by the diffraction grating formed by the mask 44 can be projected to the sample S with high contrast. By improving the contrast of the stripe pattern, the S/N ratio of the super resolution component included in the original image is enhanced. Therefore, the total internal reflection fluorescence microscope 40 can improve the quality of super resolution images more effectively than the fluorescence microscope 20.

Furthermore, since the total internal reflection fluorescence microscope 40 can detect only the fluorescence generated from the vicinity of the slide glass G by the TIRF illumination, it is especially effective in detecting single-molecular fluorescence.

In addition, the total internal reflection fluorescence microscope 40 can use white light source such as a mercury lamp etc. instead of the laser 41. In this case, it is preferable that an excitation filter is included in the illumination optical path.

Embodiment 3

Figure 14B:
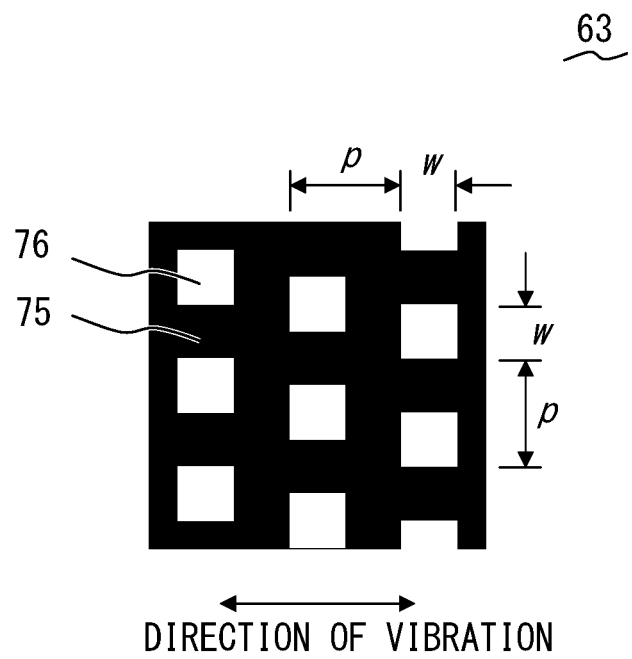
FIG. 14B is an explanatory view of a mask pattern of a confocal mask included in the fluorescence microscope exemplified in FIG. 14A.

FIG. 14A exemplifies the configuration of the fluorescence microscope according to the present embodiment. FIG. 14B is an explanatory view of a mask pattern of a confocal mask included in the fluorescence microscope exemplified in FIG. 14A.

A fluorescence microscope 60 exemplified in FIG. 14A is a sample observation device, and includes a mercury lamp 61 for generating excitation light for exciting the sample S; an optical image forming system 62 for projecting the excitation light to the sample S, and forming at the intermediate image position an intermediate image of the sample S from the observing light generated by emitting the excitation light to the sample S; a confocal mask 63 formed as a plate for modulating the spatial intensity distributions of the excitation light and the intermediate image at the intermediate image position; a drive device 64 for moving the modulation pattern of the confocal mask 63 relative to the intermediate image; an image pickup lens 65 for relaying on the image forming surface the intermediate image whose spatial intensity distribution has been modulated; an EM-CCD 66 for converting the spatial intensity distribution of the intermediate image relayed on the image forming surface into digital image data; a computer 67 for performing image processing on the digital image data, and an image processing board 68.

The fluorescence microscope 60 further includes an illumination lens 71, a fluorescent filter cube formed by an excitation filter 72, a blocking filter 73, and a dichroic mirror DM, a storage medium 69, and a monitor 70. The optical image forming system 62 includes an objective OB and a tube lens TL.

As exemplified in FIG. 14B, the confocal mask 63 formed as a plate has a cyclic pattern. The confocal mask 63 includes a shielding unit 75 and a plurality of square apertures 76 having an aperture width w. The plurality of apertures 76 are arranged with the aperture period p vertically and horizontally. The apertures 76 are arranged so that the vertical positions of the horizontally adjacent apertures 76 are different. Therefore, only by the drive device 64 vibrating the plate (confocal mask 63) in one direction, an isotropical super resolution image can be obtained. Accordingly, the drive device 64 can be, for example, a vibrator.

Otherwise, the cutoff frequency of the optical image forming system 62, the cutoff frequency of the image pickup lens 65, the Nyquist frequency of the EM-CCD 66, the aperture width w and the period p of the aperture 76 have characteristics similar to those of the fluorescence microscope 20 according to the embodiment 1.

In the fluorescence microscope 60, while vibrating the plate by the drive device 64, an intermediate image of the sample S which has passed the pattern of the confocal mask 63 formed as a plate is captured by the EM-CCD 66. The drive device 64 sets the amplitude of the vibration of the plate as equal to or exceeding the aperture period p of the aperture 76 in the direction of the vibration. It is more preferable that the amplitude is integral multiple of the aperture period p. The exposing time of the EM-CCD 66 set longer than the vibration period of the plate by the drive device 64. If the amplitude is integral multiple of the aperture period p, it is preferable that the exposing time of the EM-CCD 66 is set as the time indicating an integral multiple of the vibration period of the plate.

The original image captured by the EM-CCD 66 is transmitted as digital image data to the image processing board 68, and the image processing board 68 enhances the high frequency component exceeding the cutoff frequency of the optical image forming system 62 for the digital image data. To be practical, the convolution process by a 3×3 kernel matrix is performed in real time. Afterwards, the super resolution image whose high frequency component is enhanced is displayed on the monitor 70, and simultaneously stored on the storage medium 69 through the computer 67.

Therefore, since the fluorescence microscope 60 can generate a super resolution image with high time resolution as with the fluorescence microscope 20 according to the embodiment 1, the sample S can be observed in real time.

Embodiment 4

Figure 15B:
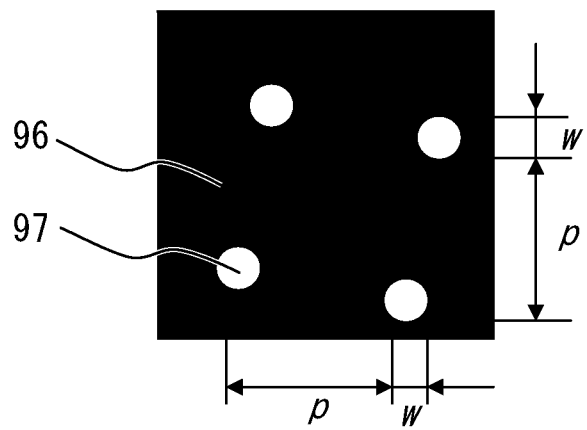
FIG. 15B is an explanatory view of a mask pattern of a mask included in the fluorescence microscope exemplified in FIG. 15A.

FIG. 15A exemplifies the configuration of the fluorescence microscope according to the present embodiment. FIG. 15B is an explanatory view of a mask pattern of a mask included in the fluorescence microscope exemplified in FIG. 15A.

A fluorescence microscope 80 exemplified in FIG. 15A is a sample observation device, and includes a laser 81 for generating excitation light for exciting the sample S; an optical image forming system 82 for projecting the excitation light to the sample S, and forming at the intermediate image position an intermediate image of the sample S from the observing light generated by emitting the excitation light to the sample S; a mask 83 formed as a rotary disc for modulating the spatial intensity distributions of the excitation light and the intermediate image at the intermediate image position; a motor 84 for moving the modulation pattern of the mask 83 relative to the intermediate image; an image pickup lens 85 for relaying on the image forming surface the intermediate image whose spatial intensity distribution has been modulated; an EM-CCD 86 for converting the spatial intensity distribution of the intermediate image relayed on the image forming surface into digital image data; a computer 87 for performing image processing on the digital image data, and an image processing board 88.

The fluorescence microscope 80 further includes a single mode optical fiber 91, a beam expander 92, a dichroic mirror DM, a blocking filter 94, a storage medium 89, and a monitor 90. The optical image forming system 82 includes an objective OB and a tube lens TL.

As exemplified in FIG. 15B, the mask 83 formed as a rotary disc has a cyclic pattern. The mask 83 includes a shielding unit 96 and a plurality of pinhole-shaped apertures 97 having an aperture diameter w. The plurality of apertures 97 are arranged with the aperture period p vertically and horizontally. That is, the rotary disc functioning as the mask 83 is so-called a Nipkow disc which has the pinhole-shaped aperture 97.

The fluorescence microscope 80 includes a microlens array 93 arranged between the laser 81 and the mask 83. The pinhole-shaped aperture sets at the condensing position of microlens array 93. The motor 84 rotates the microlens array 93 and the mask 83 without changing the relative positions between the microlens array 93 and the mask 83. thus, the loss of light quantity of the excitation light caused when entering the shielding unit 96 can be suppressed, and a large amount of excitation light can be emitted to the sample S.

Although FIGS. 15A and 15B exemplify the microlens array 93 and the Nipkow disc, the present invention is not limited to these components. For example, the Nipkow disc can be replaced with a rotary disc formed by a mask having a line-and-space structure as exemplified in the embodiment 1. In this case, the microlens array 93 can be replaced with a cylindrical lens for which a line-shaped aperture is set at the condensing position. The fluorescence microscope 80 can also be configured to realize the TIRF illumination as exemplified in the embodiment 2.

Otherwise, the aperture period p in the mask 83 is set as nearly triple the aperture diameter w. Therefore, in the fluorescence microscope 80, a sectioning effect by the Nipkow disc occurs. In addition, the cutoff frequency of the optical image forming system 82, the cutoff frequency of the image pickup lens 85, the Nyquist frequency of the EM-CCD 86, and the aperture diameter w of the aperture 97 have the characteristics similar to those of the fluorescence microscope 20 according to the embodiment 1.

In the fluorescence microscope 80 according to the present embodiment, the sample S is excited by the laser light (excitation light) emitted from the laser 81 while rotating the mask 83 and the microlens array 93 by the motor 84, and the fluorescence is detected by the EM-CCD 86 through the rotating mask 83, thereby acquiring at a high speed the original image including the super resolution component. Furthermore, the high frequency enhancing process in which the computer 87 and the image processing board 88 enhance the super resolution component is performed, thereby generating at a high speed the super resolution image whose super resolution component has been visualized.

Therefore, the fluorescence microscope 80 according to the present embodiment can generate a super resolution image having high visibility of the super resolution component with high time resolution, thereby successfully observing the sample S in real time.

What is claimed is:
1. A sample observation device comprising:
an excitation light generation unit which generates excitation light for exciting a sample;
an intermediate image forming unit which projects the excitation light to the sample, and forms an intermediate image of the sample at an intermediate image position from observing light generated by illuminating the sample with the excitation light;
a confocal modulation unit which modulates spatial intensity distributions of the excitation light and the intermediate image at the intermediate image position;

a modulation drive unit which moves a modulation pattern of the confocal modulation unit relative to the intermediate image;

an image relay unit which relays on an image forming surface the intermediate image whose spatial intensity distribution has been modulated;

an image pickup unit which converts the spatial intensity distribution of the intermediate image relayed on the image forming surface into digital image data; and an image processing unit which performs image processing on the digital image data, wherein:
the confocal modulation unit comprises a mask having a pinhole-shaped aperture arranged periodically;
a cutoff frequency of the image relay unit exceeds a cutoff frequency of the intermediate image forming unit;
a Nyquist frequency of the image pickup unit exceeds the cutoff frequency of the intermediate image forming unit; and
the image processing unit performs a high frequency enhancing process for enhancing a high frequency component exceeding the cutoff frequency of the intermediate image forming unit.

2. The device according to claim 1, wherein:
the modulation pattern is a pattern that repeats cyclically; and
an exposing time for acquiring an image by the image pickup unit is equal to or greater than a time in which the modulation pattern moves one cycle of the modulation pattern with respect to the intermediate image.

3. The device according to claim 1, wherein the cutoff frequency of the image relay unit is equal to or greater than 1.5 times the cutoff frequency of the intermediate image forming unit.

4. The device according to claim 1, wherein the Nyquist frequency of the image pickup unit is equal to or greater than 1.5 times the cutoff frequency of the intermediate image forming unit.

5. The device according to claim 1, wherein a period of the pinhole-shaped aperture arranged periodically is longer than a period regulated by the cutoff frequency of the intermediate image forming unit.

6. The device according to claim 1, wherein:
the confocal modulation unit comprises a rotary disc that comprises the mask; and
the modulation drive unit comprises a motor for rotating the rotary disc.

7. The device according to claim 6, wherein the rotary disc is a Nipkow disc.

8. The device according to claim 1, wherein:
the confocal modulation unit comprises a plate that comprises the mask; and
the modulation drive unit comprises a vibrator for vibrating the plate.

9. The device according to claim 1, wherein:
the confocal modulation unit comprises a rotary drum that comprises the mask; and
the modulation drive unit comprises a motor for rotating the rotary drum.

10. The device according to claim 1, wherein the sample observation device comprises a plurality of confocal modulation units having different modulation patterns, wherein any confocal modulation unit is selectable from among the plurality of confocal modulation units, and insertable into an optical path.

11. The device according to claim 1, wherein:
the confocal modulation unit comprises a spatial light modulator;
the modulation drive unit comprises a drive circuit for driving the spatial light modulator.

12. The device according to claim 1, wherein the intermediate image forming unit has a variable projection magnification.

13. The device according to claim 1, wherein the image relay unit has a variable relay magnification.

14. The device according to claim 1, wherein the high frequency enhancing process subtracts from the digital image data a pseudo wide-field image obtained by operating a low pass filter on the digital image data.

15. The device according to claim 14, wherein the high frequency enhancing process is a convolution process using a kernel matrix.

16. The device according to claim 1, wherein the high frequency enhancing process subtracts from the digital image data a wide-field image of the sample obtained without operating the confocal modulation unit.

17. A sample observation device comprising:
an excitation light generation unit which generates excitation light for exciting a sample;
an intermediate image forming unit which projects the excitation light to the sample, and forms an intermediate image of the sample at an intermediate image position from observing light generated by illuminating the sample with the excitation light;
a rotary disc in which a mask having a line-and-space structure arranged periodically is formed, and which modulates spatial intensity distributions of the excitation light and the intermediate image at the intermediate image position;
a motor which rotates the rotary disc to move a modulation pattern of the rotary disc relative to the intermediate image;
an image relay unit which relays on an image forming surface the intermediate image whose spatial intensity distribution has been modulated;
an image pickup unit which converts the spatial intensity distribution of the intermediate image relayed on the image forming surface into digital image data; and
an image processing unit which performs image processing on the digital image data,
wherein:
an exposing time for acquisition of one image by the image pickup unit is equal to or greater than a time needed for a half rotation of the rotary disc;
a cutoff frequency of the image relay unit exceeds a cutoff frequency of the intermediate image forming unit;
a Nyquist frequency of the image pickup unit exceeds the cutoff frequency of the intermediate image forming unit; and
the image processing unit performs a high frequency enhancing process for enhancing a high frequency component exceeding the cutoff frequency of the intermediate image forming unit.

18. The device according to claim 17, wherein a period of the line-and-space structure is longer than a period regulated by the cutoff frequency of the intermediate image forming unit.

19. The device according to claim 17, wherein the mask includes a phase shift film.

20. The device according to claim 17, further comprising:
an annular illumination unit for annularly illuminating the sample with the excitation light, wherein the annular illumination unit is located near a position conjugate with a pupil position of an objective included in the intermediate image forming unit.

* * * * *